H. I. MORRIS.
LOOM.
APPLICATION FILED SEPT. 9, 1916.
1,369,531.
Patented Feb. 22, 1921.
16 SHEETS—SHEET 7.
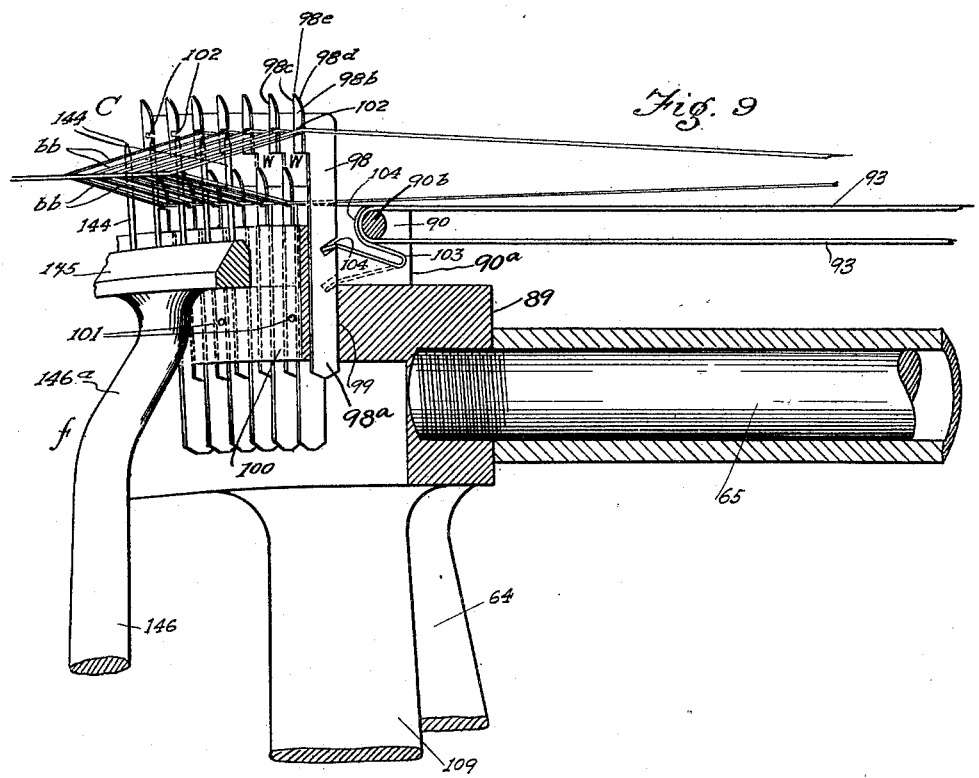
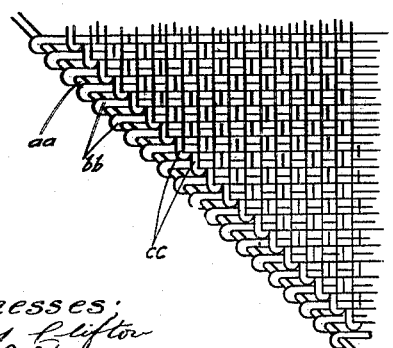

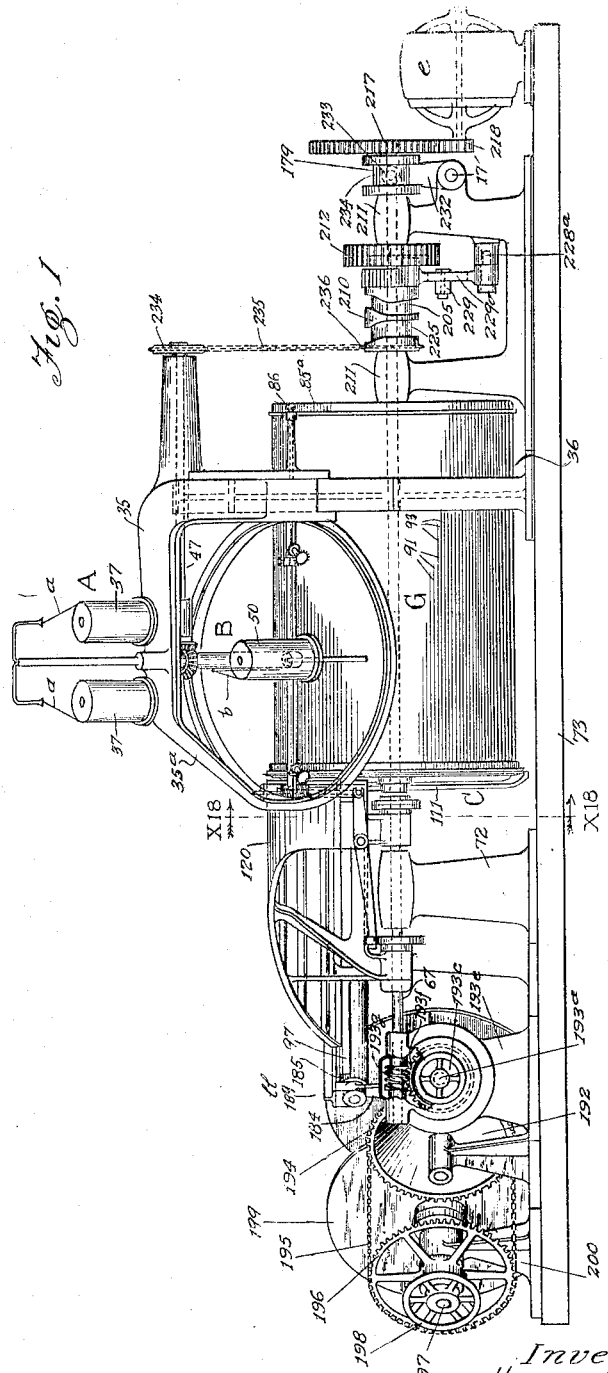

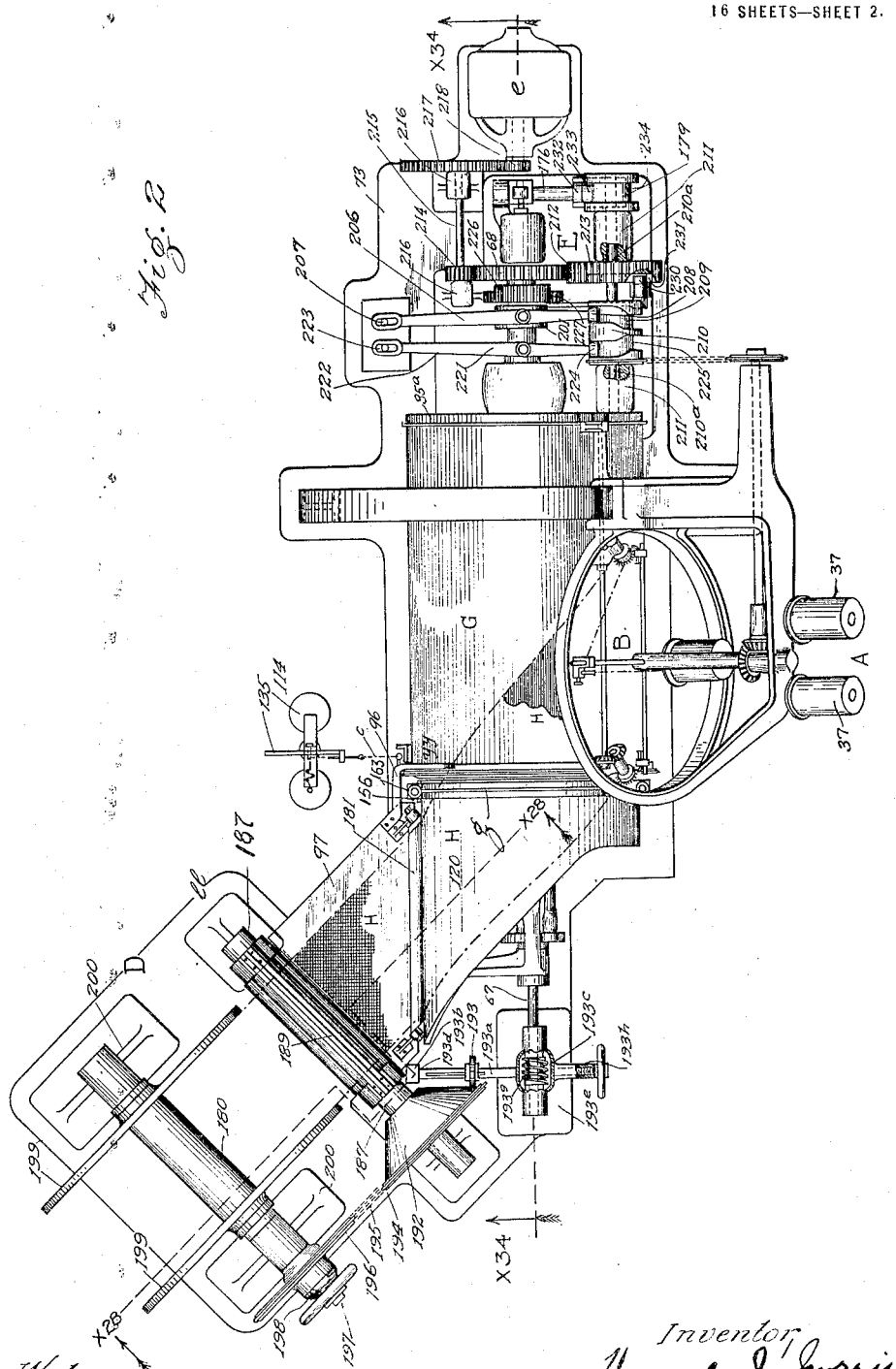

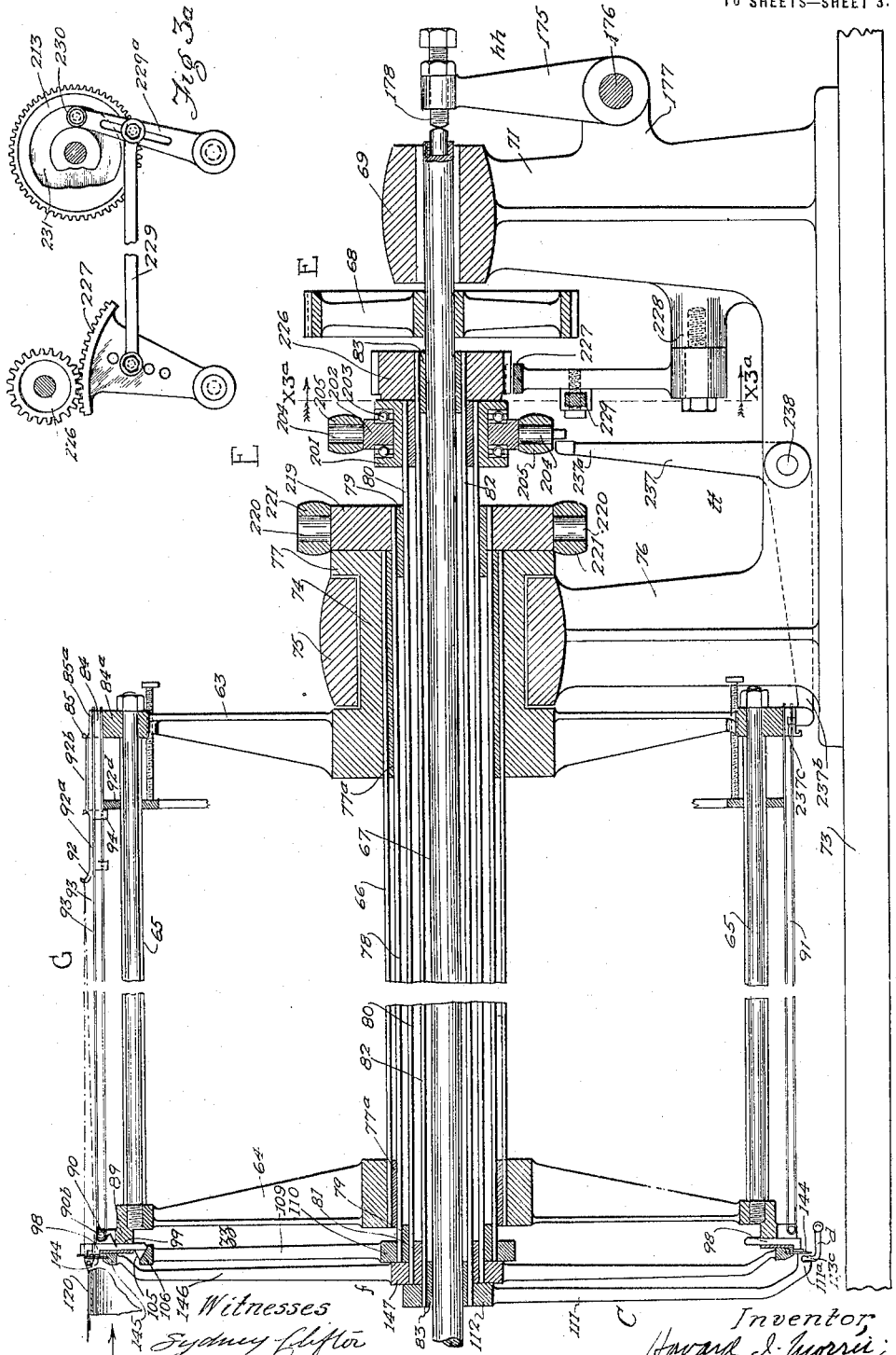

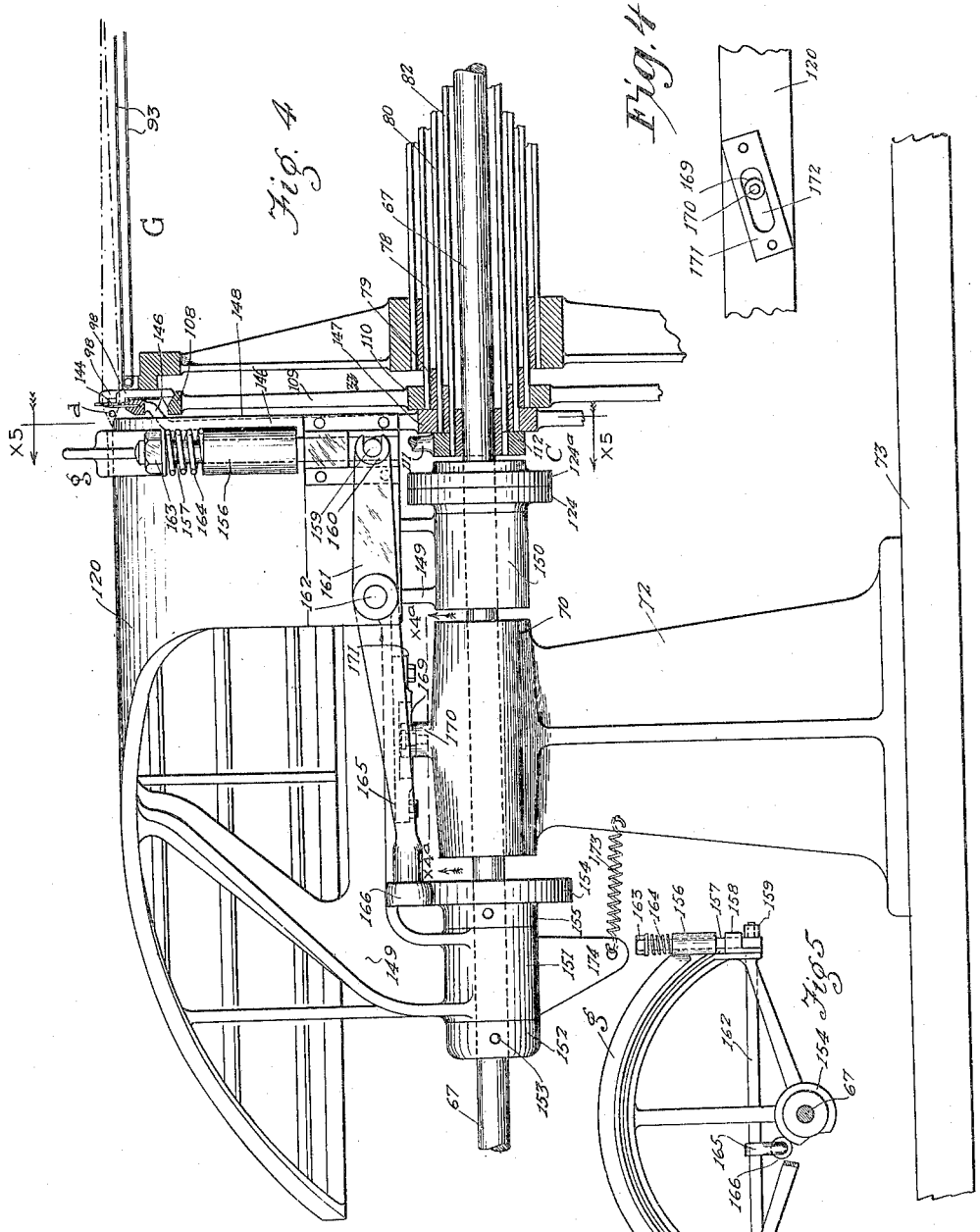

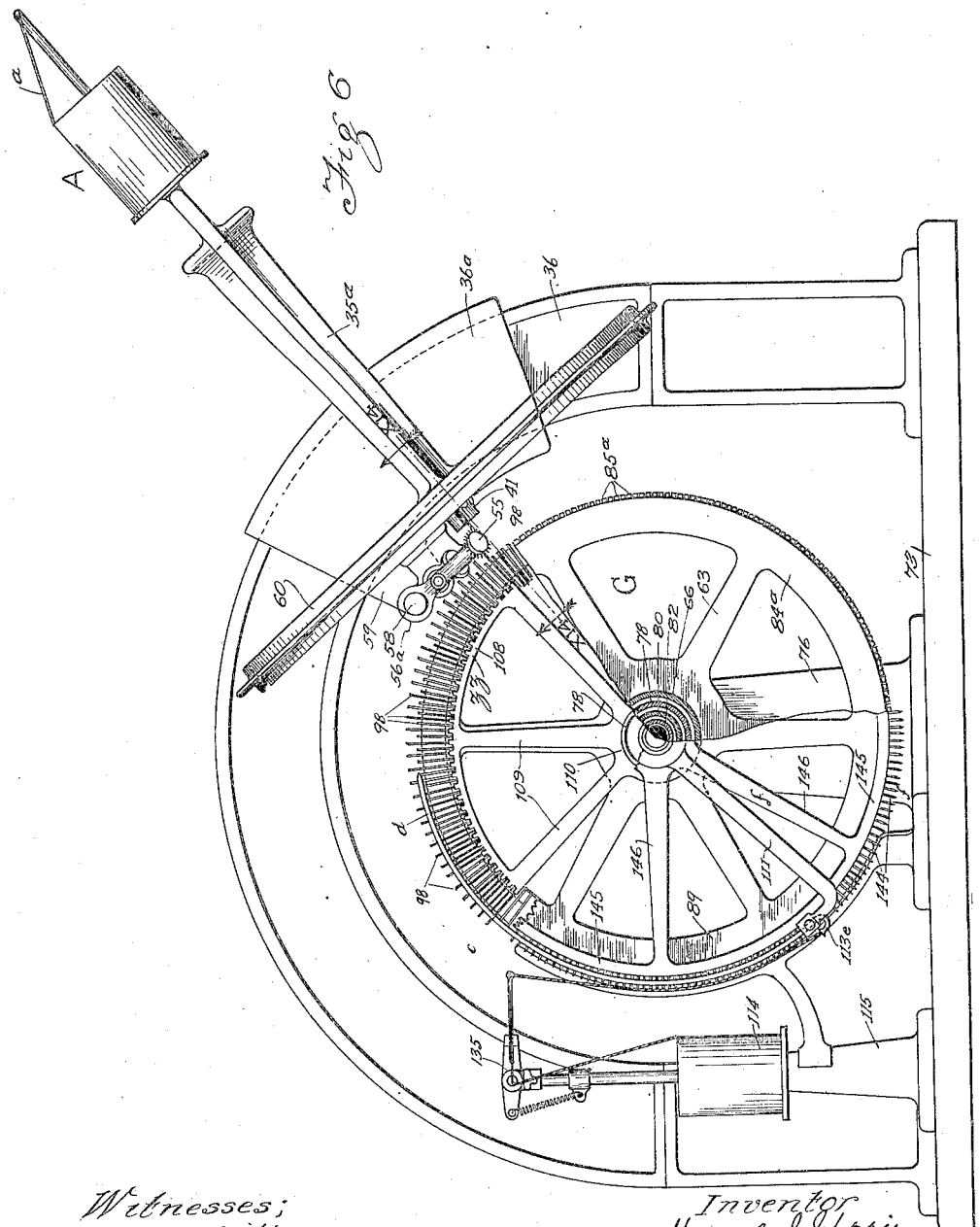

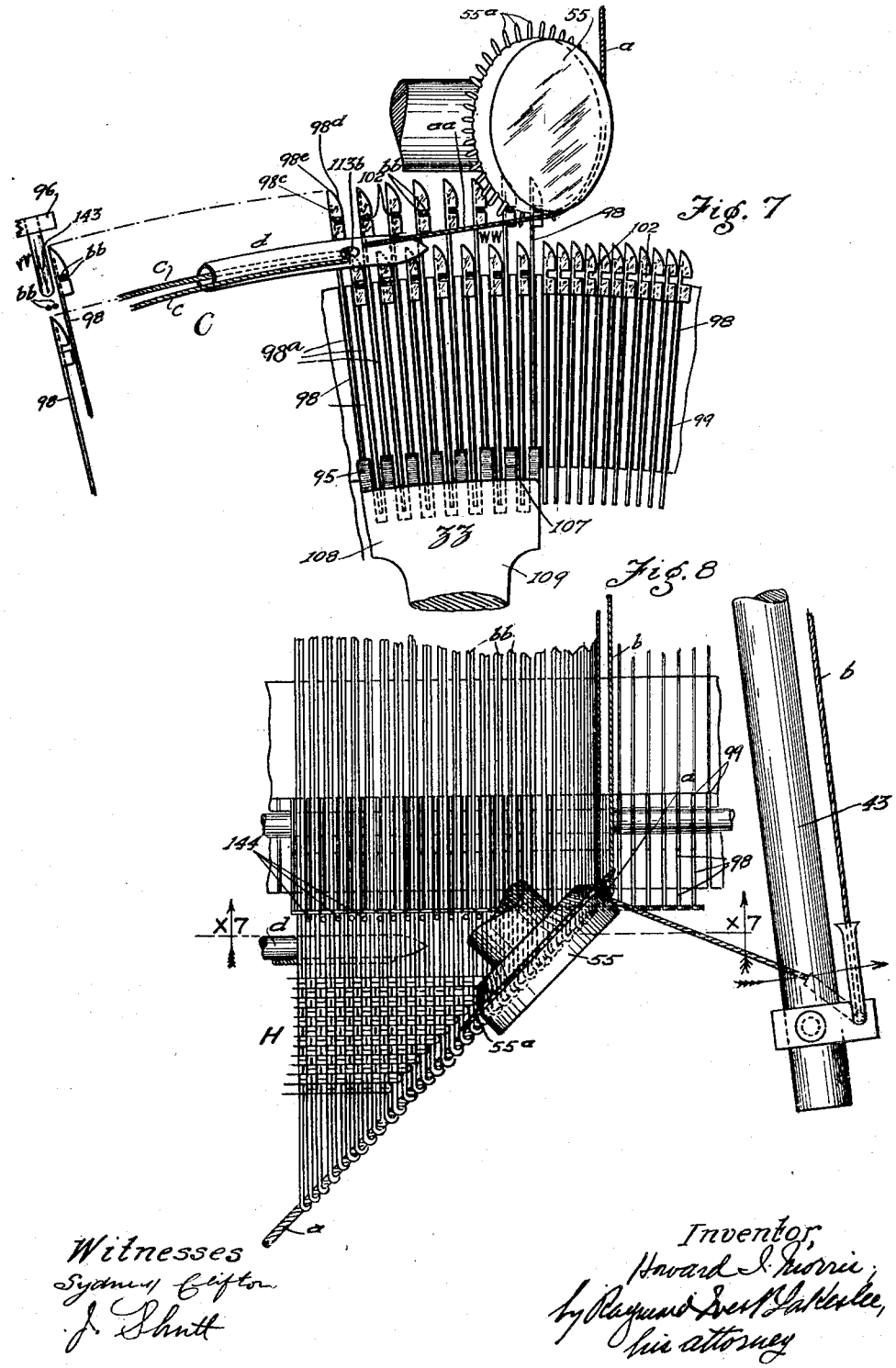

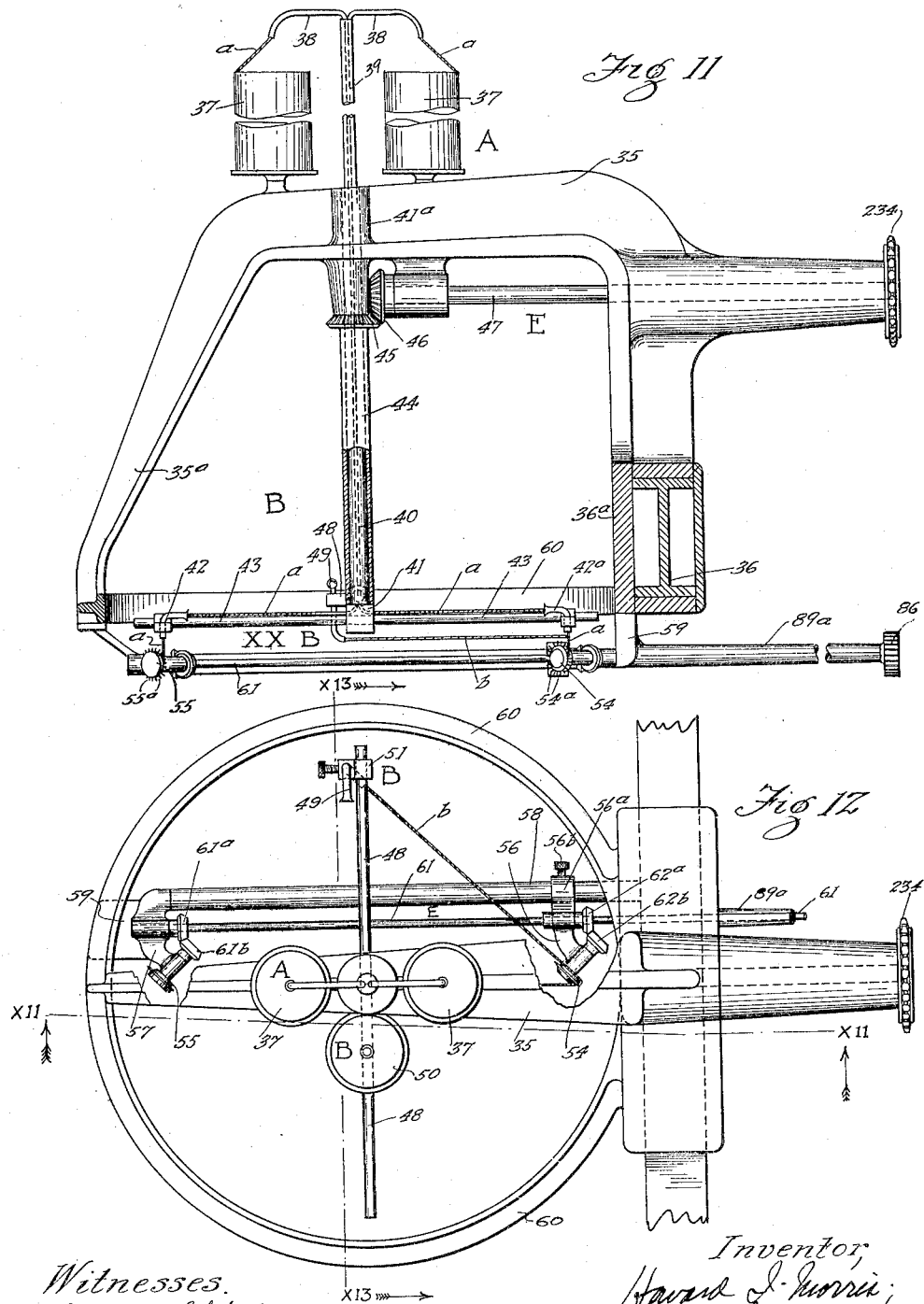

H. I. MORRIS.
LOOM.
APPLICATION FILED SEPT. 9, 1916.

1,369,531.

Patented Feb. 22, 1921.
16 SHEETS—SHEET 9.

Witnesses:
Sydney Clifton
J. Shutt

Inventor,
Howard I. Morris,
by Raymond ......
his attorney.

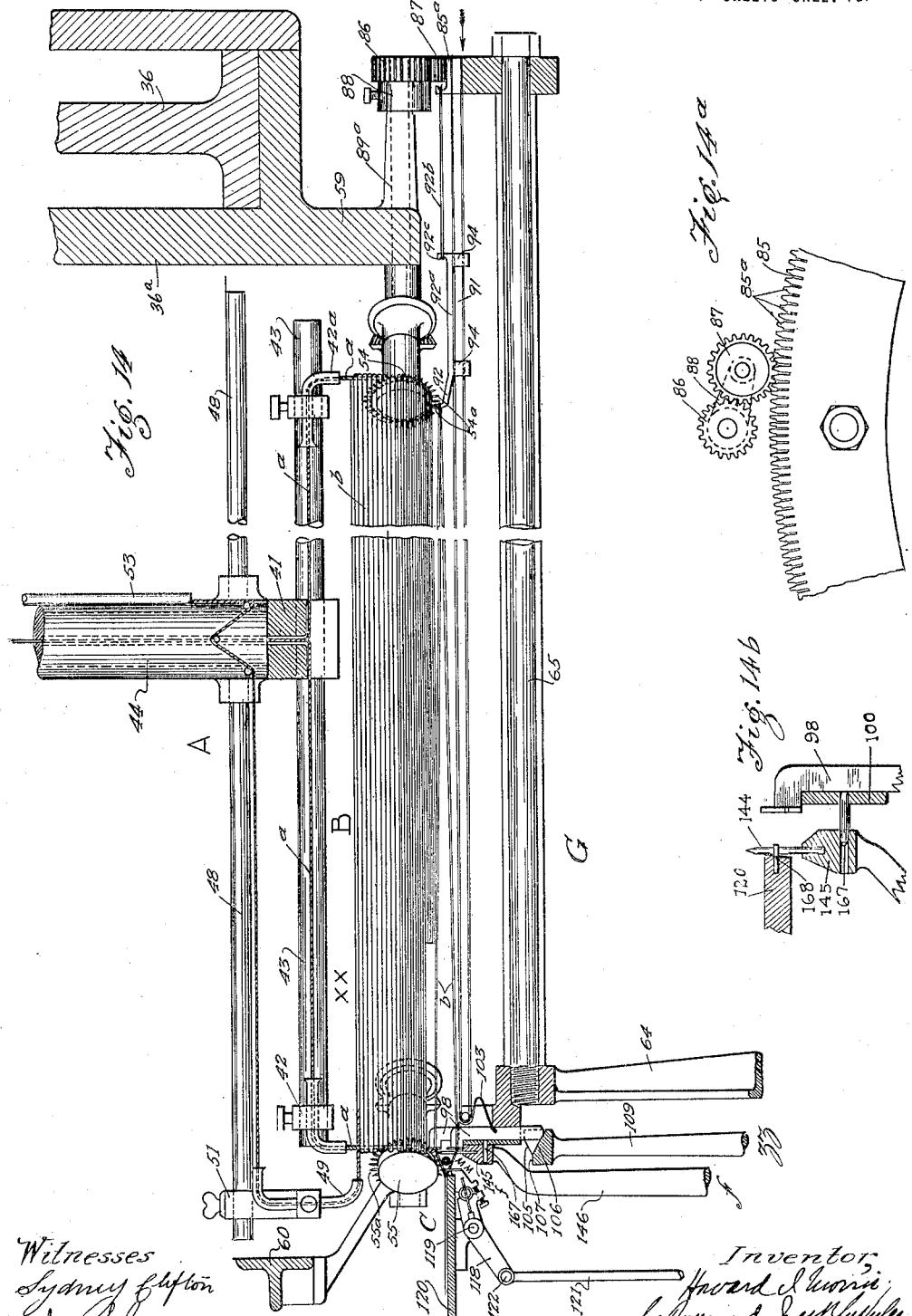

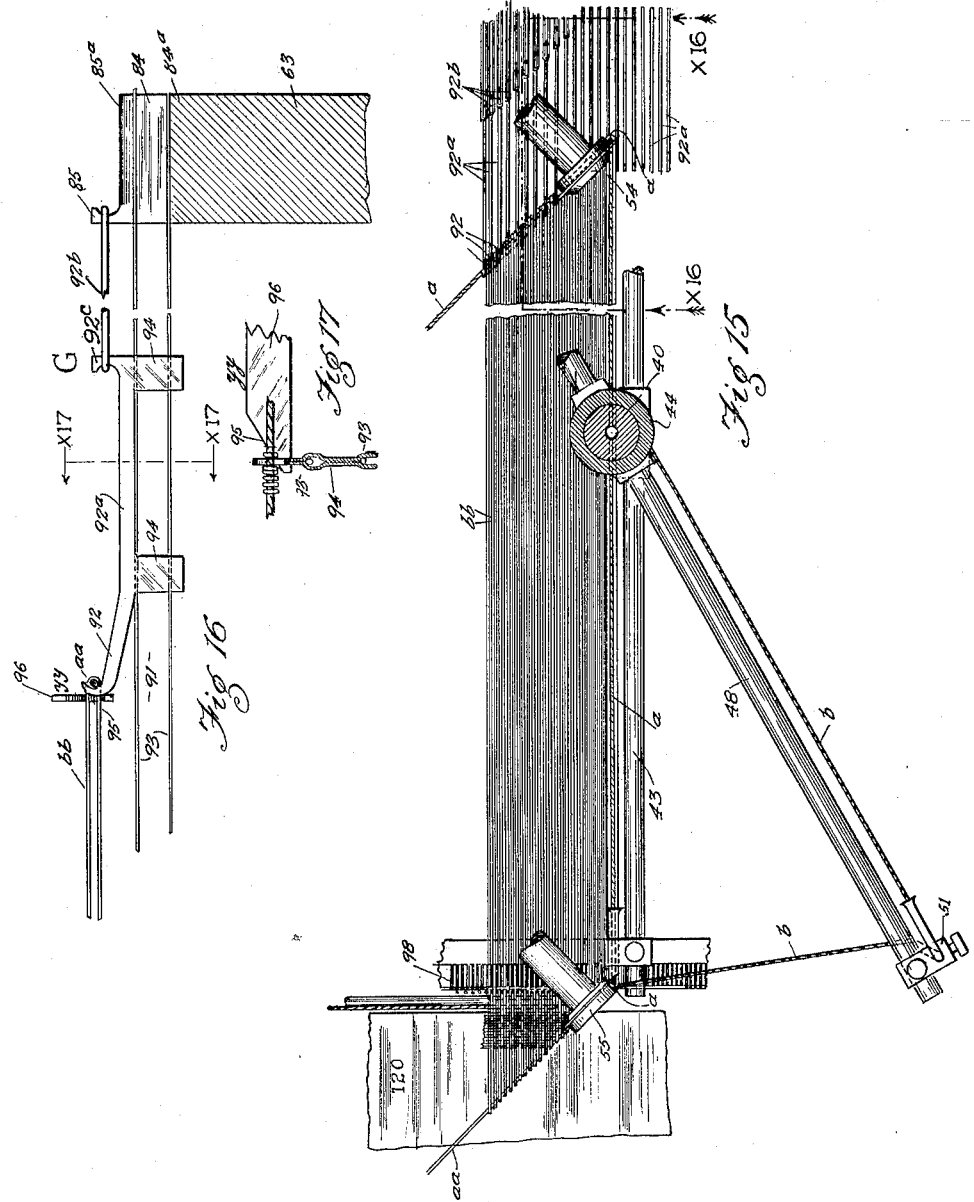

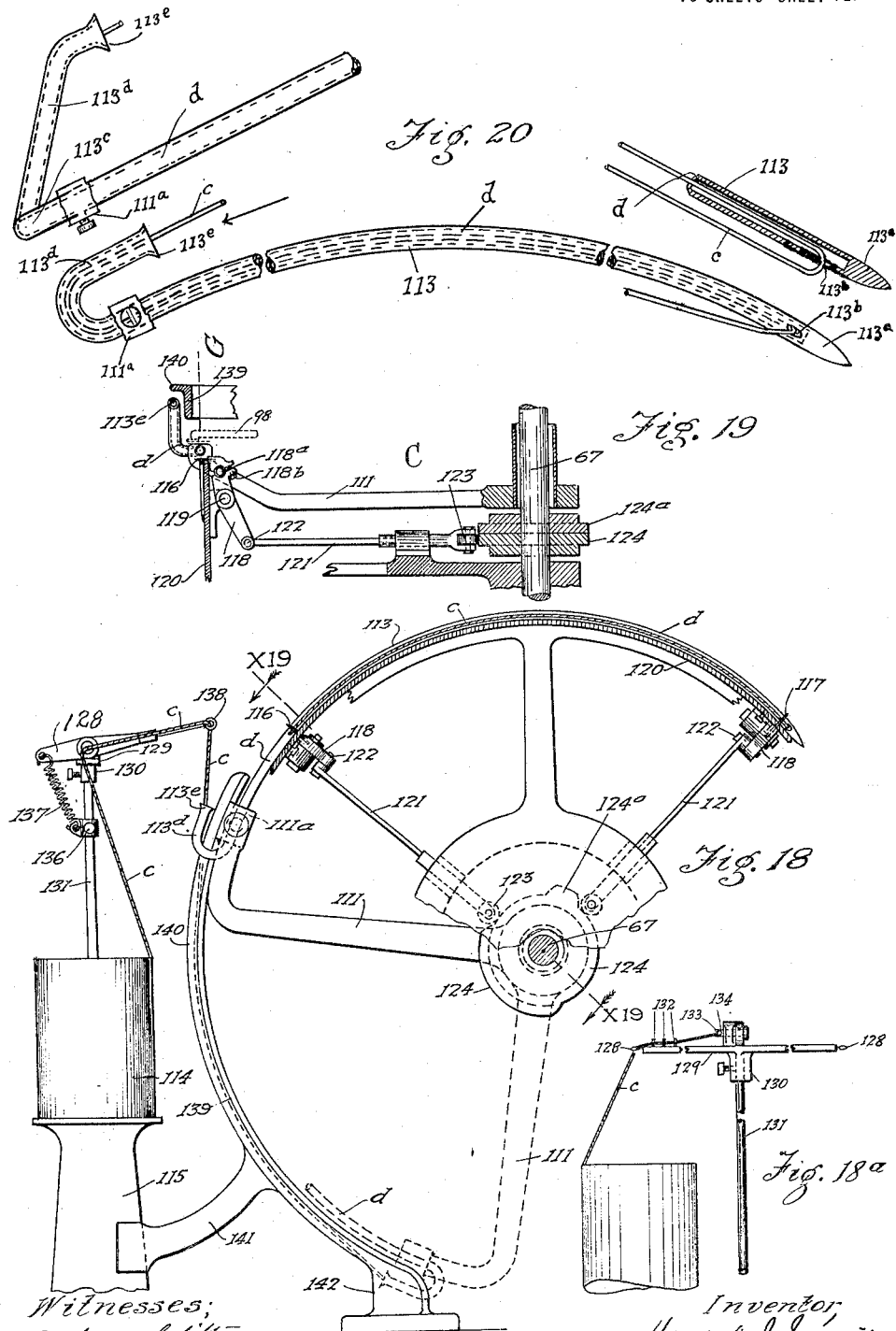

H. I. MORRIS.
LOOM.
APPLICATION FILED SEPT. 9, 1916.
1,369,531. Patented Feb. 22, 1921.
16 SHEETS—SHEET 13.
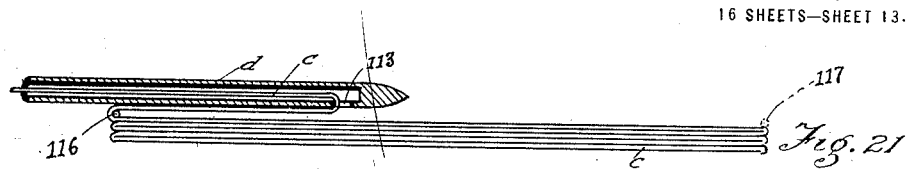
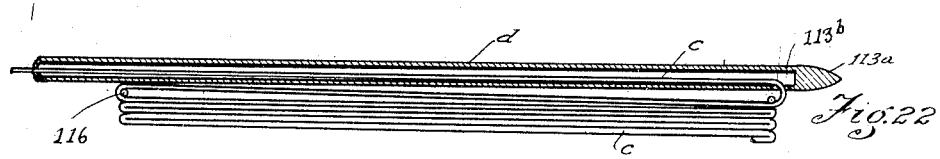
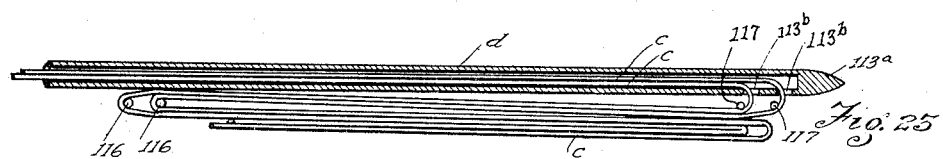
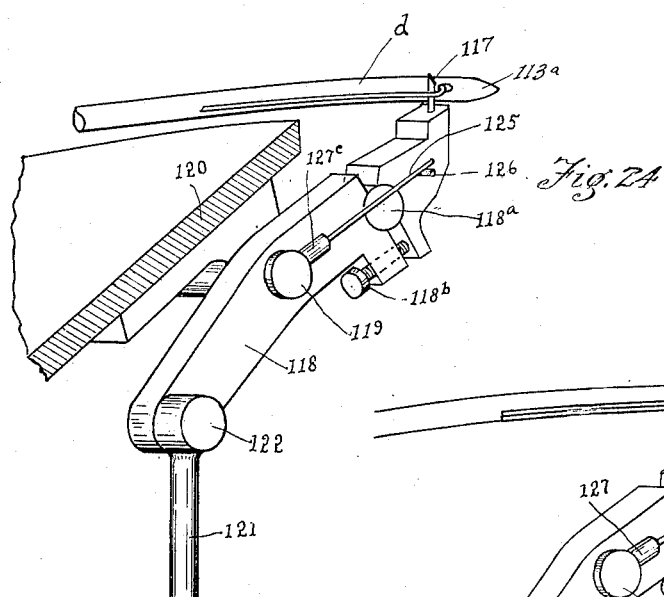
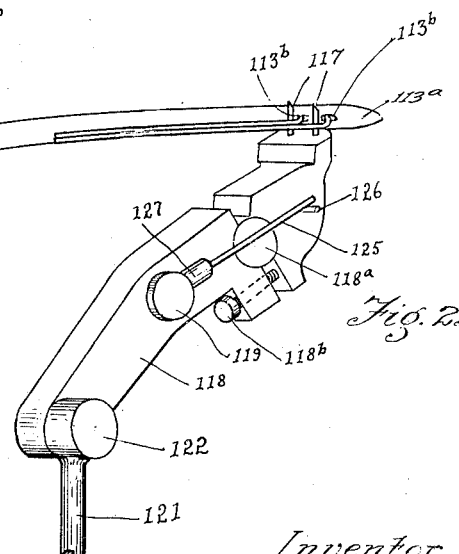

H. I. MORRIS.
LOOM.
APPLICATION FILED SEPT. 9, 1916.

1,369,531.

Patented Feb. 22, 1921.
16 SHEETS—SHEET 14.

Witnesses
Sydney Clifton
J. Shutt

Inventor
Howard I. Morris
by Raymond ...
his attorney

H. I. MORRIS.
LOOM.
APPLICATION FILED SEPT. 9, 1916.
1,369,531.
Patented Feb. 22, 1921.
16 SHEETS—SHEET 15.
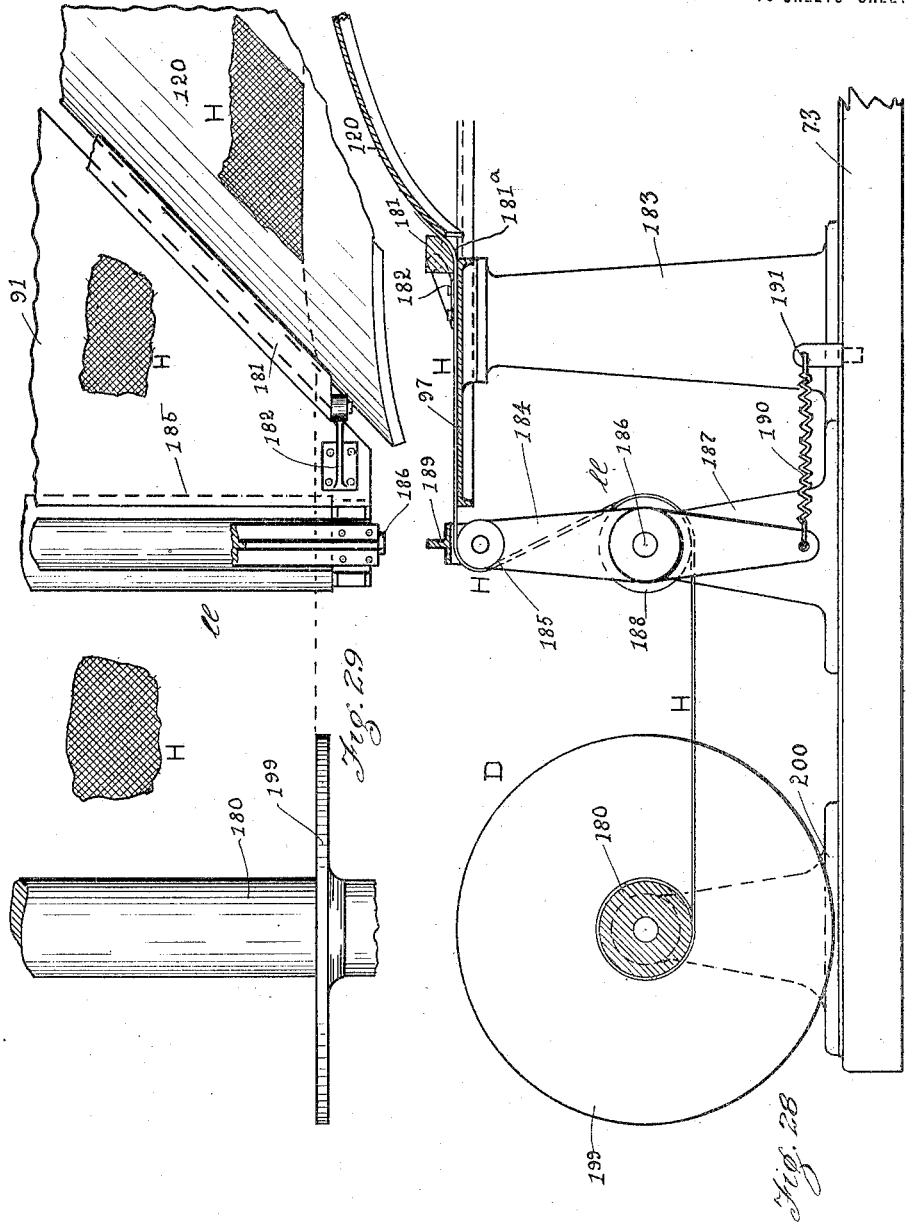

Fig. 30
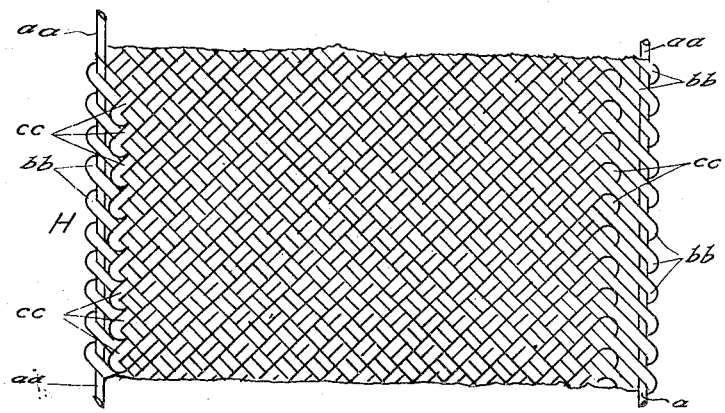
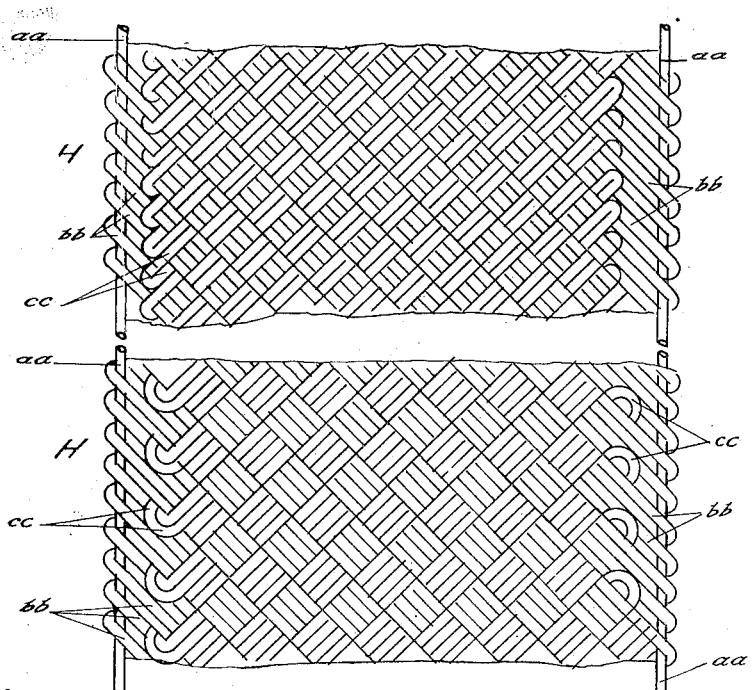

UNITED STATES PATENT OFFICE.

HOWARD I. MORRIS, OF SAN DIEGO, CALIFORNIA, ASSIGNOR TO THE SAVAGE TIRE COMPANY, OF SAN DIEGO, CALIFORNIA, A CORPORATION OF CALIFORNIA.

LOOM.

1,369,531. Specification of Letters Patent. Patented Feb. 22, 1921.

Application filed September 9, 1916. Serial No. 119,208.

*To all whom it may concern:*

Be it known that I, HOWARD I. MORRIS, a citizen of the United States, residing at San Diego, in the county of San Diego and State of California, have invented new and useful Improvements in Looms, of which the following is a specification.

This invention relates to looms, and more particularly to looms for weaving bias fabrics or fabrics in which the warp and weft threads are related to the longitudinal edge of the fabric at angles other than 90 degrees. The invention further relates to looms for weaving such bias fabrics with a selvage edge or edges so constituted as to prevent stretching of the fabric in a direction lengthwise of the selvage, and preferably organized of threads or fabric elements independent of the warp and weft threads. Such bias fabrics, irrespective of the selvage formations and likewise irrespective of a close, dense or compact formation, have been woven before; but it is believed that no machine or loom has heretofore been devised for producing such bias fabrics of close compact inter-relation of warp and weft threads, the resultant fabric being dense and having inherent stability as against ready stretching or undue stretching in any direction. Such bias fabrics as heretofore woven, within my knowledge, due to the lack or absence of such density and close formation, and further due to the absence of a stretch-resisting selvage edge, are of only limited utility and value in the wide range of the arts, and more particularly in those arts in which such bias weave formation is of the greatest advantage. Among such arts last referred to are those relating to the production of tubular or arched structures, such as tire bodies or casings, hose, electrical conduit covering and the like, in which it is desirable to evenly lay or apply the woven fabric onto a core or over a core, or to associate it with a generally cylindrical or circular surface, to the end that the fabric may be equally and evenly extended in all directions. More particularly I have in mind the use of such bias fabric, rubberized or calendered, or associated with other materials in composition form, as the chief structural substance of the carcass of a pneumatic tire. In this art, if woven fabric be used in which the warp and weft threads are either of them related to the fabric edge rectangularly, extreme difficulty is encountered in properly applying the fabric or the successive courses or layers of the fabric to the tire-forming core, inasmuch as such application involves the extension of the fabric in two directions of curvature, and the resultants of such two directions of curvature. Therefore it has been recently more or less common practice to split up or subdivide sheets or lengths of fabric having the threads inter-woven in rectangular relation to the edge, into lengths or strips or bands in which the threads are inter-related with the edge on the bias. These separate strips or bands are then spliced or seamed together, and from them the tire carcass is built up, after the proper or preferred calendering, rubberizing or other treatment. To that end it has been necessary to provide suitable machines for diagonally severing the fabric woven with either the warp and weft threads in rectangular relation to the edge, after such fabric has been rubberized or calendered. It has likewise been necessary thereupon to splice or seam together the lengths of such fabric so severed to produce a bias formation. This splicing of course is rendered necessary by the fact that it is impracticable to weave this fabric of a width beyond certain outside dimensions. This splicing together of these lengths of fabric severed on the bias likewise produces unevenness at the lines of junction and necessarily a weakness, all of which reduces the inherent strength of the assembled lengths or strips; and, in the carcass as produced in using such spliced lengths, tends to produce roughness or unevenness or variations from true dimension. Due to these reasons an inferior tire carcass is produced, particularly from the standpoint of inherent strength. The said lines of junction or splicings or unions of the lengths of bias-cut fabric heretofore used, have produced in effect lumps or variations in thickness in the fabric, and it can be readily seen how such protuberances or unevennesses or lumps tend to weaken and disrupt the tire handicapped by the same. The thickness being greater radially of the tire through such lumps or unevennesses, a relatively greater tractional compression occurs at that point and the resultant effect is to buckle the contiguous portions of the fabric or tire carcass and eventually either break the same down or so deteriorate or weaken the same as to invite blowout or a failure of the tire. Such results cannot be prevented or avoided in the use of such built up or sectional jointed, spliced or united lengths of bias-cut fabric. It has been generally recognized that this objection could be overcome if such bias fabric could be provided in continuous formation, so that no breaks or lines of junction or seams or splices would be necessitated from one end to the other of a given length of fabric required to build up completely or provide completely all of the courses or layers of a given carcass. The present invention has as its object the provision of a loom which will have as its output an article of manufacture consisting of a woven fabric comprising warp and weft threads interrelated at a pre-determined angle but each inter-related to the longitudinal edge of the fabric at an angle other than 90 degrees. Thus the invention has for its object the provision of a loom which will weave such a bias fabric in unlimited length or at least in such length that but one length unit is required to produce the several layers or courses of a given tire carcass. Incidental to such object of the present invention is the further object of providing a loom which will produce upon such bias fabric in substantially unlimited lengths a suitable selvage edge or suitable selvage edges which will prevent lengthwise stretch of the fabric prior to or during rubberizing or calendering operations. Thus the finished tire carcass constituent is produced without variation from the absolute true lie or relative lie of the threads, and may be applied over the tire-forming core or in such other manner as desirable or suitable, to the end that a perfect adaptation of the rubberized fabric to the curvatures incident to the formation of the carcass may be produced. To permit this adaptation of the fabric to the curvatures incident to formation of the tire carcass, the selvage edges, having served their purpose and function, are severed from the fabric, and the final or ultimate stretch requisite for such adaptation is thus not interfered with by the otherwise present holding action of the selvage. To provide such a selvage edge I have determined that it is necessary to organize the selvage either independently of the thread formation of the body of the bias fabric, or at least to provide a selvage so compact and dense in weave that it will not permit a yield, slip or stretch of the fabric. The present invention therefore aims at the provision of a loom which will produce a novel and useful article of manufacture, namely, a continuous length of woven fabric the warp and weft threads of which, at pre-determined relative angularity, are each related angularly to the longitudinal edge of the fabric at an angle other than that of 90 degrees; such fabric likewise preferably having a selvage edge of inherent strength and resistance to stretch capable of preventing material longitudinal extension of the fabric prior to or during the process of calendering, rubberizing or treatment of the fabric. The present invention likewise aims at producing and providing a loom capable of turning out the aforesaid woven fabric or article of manufacture in divers patterns, designs or multiple provisions of threads for each warp or weft unit, so that, in accordance with varying conditions of service or preferences in design, variegated weaves of the fabric may be produced.

In the above and other respects I consider the present invention to be radical and basic, more particularly as I have been extensively engaged in the manufacture of vehicle tires or pneumatic tire casings and am well informed in that art. The invention has for its further objects the provision of an improved loom having the above general characteristics, which will be superior in point of relative simplicity and inexpensiveness taken in consideration with speed of operation, positiveness of operation, durability, freedom from liability of derangement of its parts and members, capability of operation with a minimum of attention and direction, together with a minimum of requirement of repair or alteration, and adaptability to varying conditions and requirements of use and service, and which will be generally superior in efficiency and serviceability.

With the above and other objects in view, the invention consists in the novel and useful provision, construction, formation, combination, association, inter-relation and mode of operation of parts, members, elements and features, all as hereinafter described, shown in the drawings, and finally pointed out in claims.

Several of the features and members and elements of the loom constituting the subject of this invention, considered separately and in the light of their general adaptability to other uses or other associations with other mechanisms, looms or machines, are claimed in other applications for Letters Patent, namely, an application for loom elements, Serial No. 119,210, and an application for loom elements, Serial No. 132,164.

In the drawings:

Figure 1 is a side elevation of a loom constructed and organized in accordance with the invention;

Fig. 2 is a top plan view of the same;

Fig. 3 is a longitudinal sectional view of the right hand portion of the loom, reading on Figs. 1 and 2, and taken upon the lines $x3^4$—$x3^4$, Fig. 2, upon an enlarged scale;

Figure 13:
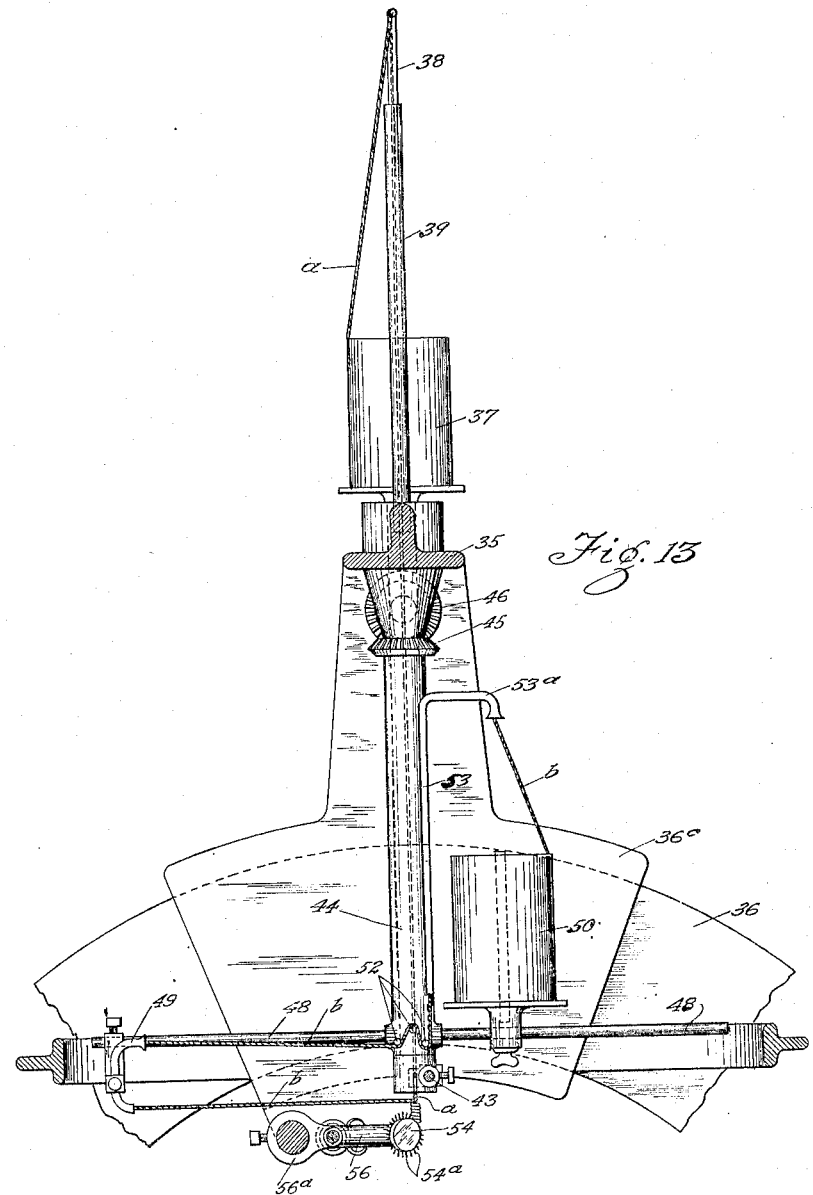
Figure 27:
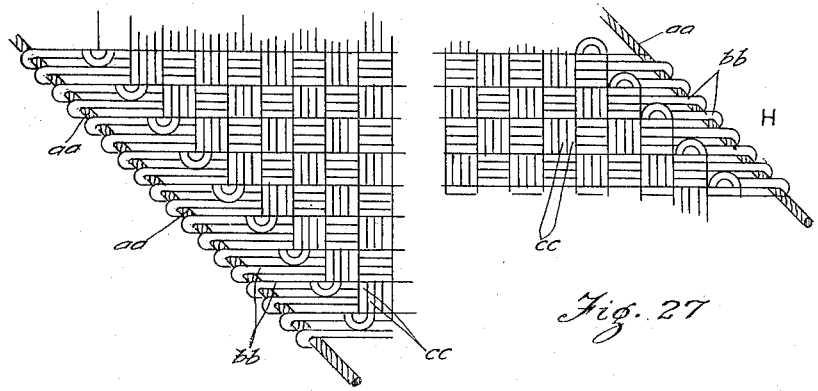
Figure 26:
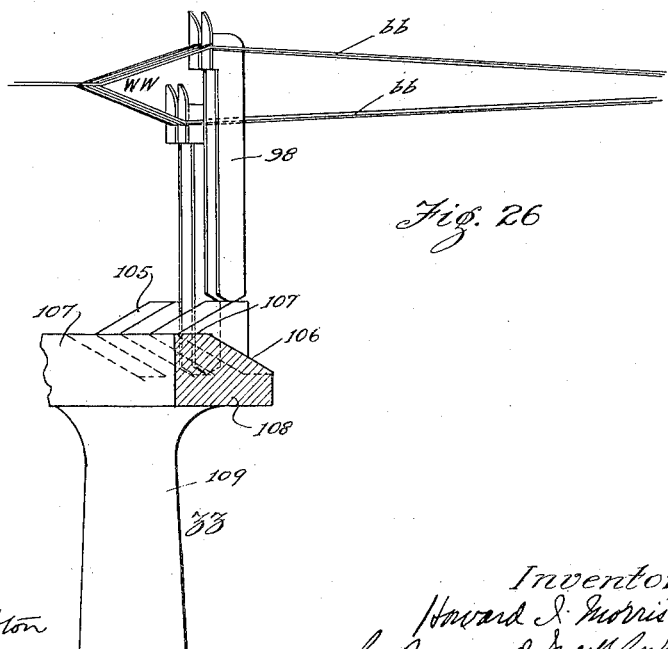

Fig. $3^a$ is a detail vertical transverse sectional view, upon a diminished scale, taken upon the line $x3^a$—$x3^a$, Fig. 3, and looking in the direction of the appended arrows, and illustrating certain details of the drive or operating means E;

Fig. 4 is a similar view taken upon the line $x3^4$—$x3^4$ in Fig. 2, and of the left hand portion of the loom reading upon Figs. 1 and 2, upon an enlarged scale;

Fig. $4^a$ is a detail fragmentary sectional view taken upon the line $x4^a$—$x4^a$, Fig. 4, and looking in the direction of the appended arrows;

Fig. 5 is a vertical transverse sectional fragmentary view, taken upon the line $x5$—$x5$, Fig. 4, and looking in the direction of the appended arrows; being upon a reduced scale;

Fig. 6 is an end view of the right hand portion of the loom shown in Fig. 3, partly broken away for clearness of illustration, and looking in the direction of the arrow in Fig. 3;

Fig. 7 is an enlarged detail fragmentary view of elements of the shed-forming member or means of the loom, with which is shown associated a fragmentary portion of the weft-producing shuttle-needle of the loom and a portion of the selvage-forming means or mechanism, such view being in effect a section taken upon the line $x7$—$x7$, Fig. 8, and looking in the direction of the appended arrows;

Fig. 8 is a top plan view of the mechanism and features shown in Fig. 7, with the addition of features of the warp-forming mechanism and weft-forming mechanism;

Fig. 9 is an enlarged fragmentary view of features of the shed-forming mechanism with which are shown associated features of comb mechanism which is adapted to finally place the weft threads after their placement in the shed by the shuttle-needle;

Fig. 10 is a fragmentary face view of a portion of bias-woven fabric such as produced by the present invention, following directly upon the action of the features shown in Fig. 9;

Fig. 11 is an enlarged fragmentary and partially sectional view of warp-forming mechanism of the loom, being in effect a view taken upon the line $x11$—$x11$, Fig. 12, looking in the direction of the appended arrows;

Fig. 12 is a top plan view of the showing in Fig. 11;

Fig. 13 is an enlarged transverse sectional view, taken upon the line $x13$—$x13$, Fig. 12;

Fig. 14 is an enlarged detail fragmentary and sectional view of features of the selvage-forming and warp-forming and shed-forming and weft-forming means of the loom, taken upon the line $x14$—$x14$, Fig. 6, and looking in the direction of the appended arrows;

Fig. $14^a$ is a partial end view of the construction shown in Fig. 14, looking in the direction of the adjacent arrow;

Fig. $14^b$ is an enlarged detail sectional view upon the same plane as that of the sectioned portions of Fig. 14, and of features at the central left hand portion of the showing in Fig. 14, particularly illustrating the interconnection of features of the loom for joint movement;

Fig. 15 is a top plan view of the showing in Fig. 14;

Fig. 16 is an enlarged detail fragmentary sectional view, taken upon the line $x16$—$x16$, Fig. 15, and looking in the direction of the appended arrows;

Fig. 17 is a detail transverse sectional view, taken upon the line $x17$—$x17$, Fig. 16, and looking in the direction of the appended arrows;

Fig. 18 is an enlarged detail fragmentary view, taken upon the line $x18$—$x18$, Fig. 1, and looking in the direction of the appended arrows, and showing features of the weft-forming mechanism;

Fig. $18^a$ is a fragmentary side elevation taken at the upper left hand side of Fig. 18, showing details of the weft-thread feed means;

Fig. 19 is a detail fragmentary sectional view, taken upon the line $x19$—$x19$, Fig. 18, and looking in the direction of the appended arrows;

Fig. 20 is a view of features of the weft-forming mechanism, and particularly of the shuttle-needle thereof, such features being shown in detached positions;

Fig. 21 is a detail sectional and diagrammatic view showing the shuttle-needle in its operation of associating the weft threads, with other features of the weft-forming mechanism which accommodate such threads in the application of the same to the warp threads;

Fig. 22 is a similar view showing the shuttle-needle in a relatively more advanced position;

Fig. 23 is a view similar to Fig. 22, illustrating a modification of operation of the loom in which a plurality of weft threads are associated with the warp threads in a single excursion of the shuttle-needle;

Fig. 24 is an isometric fragmentary view of features of the weft-forming mechanism, illustrating particularly the means whereby a single weft unit is accommodated during an excursion of the shuttle-needle and prior to its final association with the warp threads;

Fig. 25 is a view similar to Fig. 24 and corresponding with Fig. 23, showing the production of the weft by the application of a plurality of weft threads at a single excursion of the needle;

Fig. 26 is an enlarged fragmentary further view of features of the shed-forming mechanism and contemplates the modifications illustrated in Figs. 23 and 25, in which a plurality of weft threads are applied at the same time to the warp threads which latter in turn are caused to enter the shed formation in groups each containing a plurality of the warp thread courses;

Fig. 27 is a fragmentary face view of a portion of bias-woven fabric produced in utilizing the modifications of structure and operation shown in Figs. 23, 25 and 26;

Fig. 28 is a generally longitudinal sectional view, taken upon the line $x^{28}$—$x^{28}$, Fig. 2, and looking in the direction of the appended arrows;

Fig. 29 is a fragmentary plan view of the same; and,

Fig. 30 is a group of face views of a plurality of patterns or weaves of woven fabrics, capable of production in the operation of the loom being the present invention.

Corresponding parts in all the figures are designated by the same reference characters.

Referring with particularity to the drawings, the loom therein disclosed as embodying in one form and organization the several features of the present invention, comprises, in the main, warp-producing means B with which are directly associated selvage-producing means A; weft-producing means C; take-off means D so related to the zone of formation of the weft and selvage that a bias relation is established as between both the warp and the weft and the longitudinal side edge of the fabric produced, or the plane of movement of the fabric from such zone to the final element of the take-off means is diagonal with relation to the plane of such zone; and drive means or operating means E for the several members and features; such drive means or operating means being provided with or taking its power from a suitable motor or prime mover $e$.

The loom is thus seen to embrace, in combination, a plurality of leading or primary inter-related elements, members or features, each of which, as will hereinafter develop, is more or less particularly organized to produce the bias-woven selvaged fabric constituting the product of the loom. These several leading elements and features of the invention or the structure embodying the same in the form, with modifications, shown in the drawings, will now be treated of separately, before defining the inter-relation of the same and the general law of operation of the entire loom. First will be considered—

*The warp-producing means B and the associated selvage-producing means A.*

Supported upon a suitable frame 35 held in an elevated position by a standard 36, are spools or bobbins 37 which supply the thread or cord $a$ from which is produced the selvage $aa$ of the resultant fabric. These separate threads or cords are conducted to the warp-forming and selvage-forming zone which will be generally designated as XX, being led from the supply spools 37 upwardly and through separate guide tubes 38 which conduct such cords or threads to a tube 39 secured in upright position in connection with the upper end of a tubular shaft 40 suitably received in fixed position as at 41ª in the frame 35. The threads pass downwardly through this tubular shaft 40 and escape from the lower end thereof and through a block or head 41 at the lower end thereof which is suitably bored to accommodate such threads, and the threads thence are carried outwardly or radially from such shaft and passed through curved tubular guides or eyes 42 and 42ª, respectively and adjustably mounted at the outer ends of radial arms 43, carried by the block or head 41. Thence the threads depend into the working zone XX where they are associated with the warp thread, as will be hereinafter described.

Surrounding the tubular shaft 40 is a rotatable sleeve 44 which is supported at its lower end upon the block or head 41 and is rotated by suitable members or adjuncts of the operating means E, the same being shown as comprising inter-meshing miter gears 45 and 46 respectively, upon the upper end of said sleeve 44 and one end of a counter-shaft 47. Fixed to and projecting radially over the sleeve 44 in a plane slightly above that of the arms 43, is an arm 48 carrying at its outer end a curved tubular guide or eye 49 to and through which is led the cord or thread $b$, supplied from a suitable spool or bobbin 50 mounted upon the same arm 48, as is mounted the tubular guide 49. This thread $b$ ultimately becomes the warp thread $bb$, or the warp structure comprising continuous looping of such warp threads about the selvage threads $aa$, as more clearly shown in Fig. 30. Referring now particularly to Figs. 11, 12 and 13, the tubular guide 49, which if desired may be duplicated, together with the extension of the arm 48 radially in diametrically opposed directions, so that one such tubular guide is provided at each end of such arm, is, in each instance, mounted upon an adjustable block or carrier 51, which may be manipulated lengthwise of the rod 48 so as to vary the width of the resultant fabric. This width of the fabric is, however, more definitely predetermined by other factors which will be hereinafter discussed, the adjustability of the block or blocks 51 being for the purpose of conforming to the adjustments of other features, and to adapt the path of travel of the block 51 and its curved guide tube 49 to the other conditions determined by the state and relation of other features. The cord or thread $b$ is led to the respective guide tube 49 around tension pins 52, carried exteriorly upon the rotatable sleeve 44, adjacent to the lower end thereof, there being likewise mounted upon such sleeve a longitudinally ranging guide tube 53, the upper end of which is laterally extended and bent outwardly, as at 53ª, to receive at its mouth or orifice the length of thread b supplied by the spool 50.

The lower end of each guide tube 49 is disposed in the plane in the working zone XX beneath the plane in which the thread a escapes from the guide tubes 42 and 42ª, such guide tubes 42 and 42ª due to the mounting above described, being relatively stationary, and the guide tube 49 being rotated by the arm 48, which results in the thread b being wrapped or rove about the two threads a, a which produce the selvage at the edges of the resultant fabric.

In order to retain the selvage threads a in in their proper spaced relation during the wrapping or looping or roving upon and about the same of the warp thread b, and to guide what may be termed the cord fabric produced by the association of such threads a and b toward the take-off means D, or in other words, to so direct the course and trend of such cord fabric toward the take-off means as to permit the weft-producing means to introduce the weft as between the warp thread portions, and produce a bias relation as between both the warp and weft threads and the selvage threads a, the fabric as so far produced is conducted to a pair of spaced rollers 54 and 55 which are provided each with a plurality of spaced radial pins 54ª and 55ª, the plane of each such series of pins being set at the same angle to the plane of the fixed radial arms 43 which support the devices described for conducting the selvage threads a to the working zone XX; such angle in each case being less than 90 degrees, to the end that the partially formed or cord fabric fed to such pin rollers 54 and 55 shall be given a transverse twist, tending to discharge such fabric from such rollers at an angle with the plane of the path in which partially formed fabric is fed to such rollers. This direction of the course of the partially formed fabric from such rollers or rotating guides, which adapt the partially formed fabric to such changed course, is directly determined by the take-off means D, as above stated, and the relative position of the same with respect to the working zone XX.

These rotating guides or pin rollers 54 and 55 are mounted respectively in brackets 56 and 57, the roller 54 and its bracket 56 being adjustable upon a rod or extended bracket 58 held in position by suitable hangers or braces 59 depending from an annular frame 60 substantially surrounding the working zone XX and in a plane substantially that of the end block 41 upon the tubular shaft 40, such annular frame being directly supported by depending members 35ª and 36ª of the frame 35. The bracket 56 is provided with a collar 56ª surrounding the rod 58 and having a suitable set screw 56ᵇ whereby such collar and bracket and the roller 54 may be fixed in position of adjustment lengthwise of the rod 58, thus permitting of variation of the dimension of space between the roller 54 and the roller 55; this adjustment being the more particular adjustment hereinabove referred to, and associated with the adjustment of the block or blocks 51 carrying the warp-thread guides 49 for the purpose of varying the transverse dimension of the fabric.

A jack shaft or counter-shaft 61 is suitably journaled in the bracket 56 and also in the bracket 57, being an adjunct of the operating means E, and being provided with miter gears 61ª and 62ª which respectively mesh with miter gears 61ᵇ and 62ᵇ upon the ends of the rollers 54 and 55 opposite to those ends which carry the pins 54ª and 55ª; thereby providing means for supplying power from the prime mover e, as hereinafter described, for rotating both such rollers 54 and 55 in a corresponding direction, whereby the partially formed fabric engaged with the pins 54ª and 55ª is drawn down from the zone XX and directed toward the take-off means D in a deflected path, in which latter course the weft threads are applied by the weft-producing means C.

*Associated both with the warp-producing means and the weft-producing means, is a rotating transfer drum G, or carrier,* over which, and partially held by features of which, the partially formed or cord fabric is moved by the take-off means D, during the first portion of the path above referred to which is in angular relation to the path of the partially formed fabric as it is fed to or moves to the rollers or rotating guides 54 and 55. Such drum, in the specific embodiment shown in the drawings, comprises a pair of spaced end spiders 63 and 64, which are connected together by longitudinal tie-bolts 65, arranged in an annular series. These spiders 63 and 64 are mounted at their hubs upon a tubular shaft or sleeve 66 which is adapted to rotate around an inclosed concentric power shaft 67, driven by a spur gear 68 fixed to said shaft adjacent to the right hand end thereof reading upon Figs. 2 and 3, such spur gear being included within the drive or operating means E, as hereinafter described. The shaft 67 is journaled at its ends in journals or pillow blocks 69 and 70 upon suitable standards 71 and 72 mounted upon a base plate or bed 73. The spider 63 is provided with an extended hub 74 which is rotatably mounted in a suitable bearing 75 supported upon a suitable standard 76 likewise mounted upon the bed plate. Longitudinal movement of the drum D is prevented by a flange 77 upon the extended hub 74 which coöperates with the main portion of the hub of the spider 63, the same preventing such movement by co-action with the bearing 75. The tubular shaft 66 is introduced at one end and fixedly secured within the hub 74, and such hub rotates upon a smaller shaft 78, by means of a bushing $77^a$. The shaft 78 rotates upon a smaller concentric shaft 80, said shaft 78 having an internal bushing 79; and the shaft 80 in turn rotates upon a still smaller concentric shaft 82, said shaft 80 having an internal bushing 81. The tubular shaft 82 has an internal fixed bushing 83 which in turn rotates upon the central shaft 67. It will be understood that the bushing $77^a$ is duplicated within the opposite end of the tubular shaft 66, and the bushings 79, 81 and 83 are all duplicated at the other ends of the respective shafts 78, 80 and 82. The power for rotating the drum G is imparted through the central several shafts mentioned, and the particular train through which such actuation takes place will be described in connection with the construction of other features involved. The right hand spider 63 is plurally recessed or slotted radially, as at 84, throughout its periphery, producing intervening walls each of which is provided at its inner marginal portion with an upstanding and rearwardly directed catch finger 85. These intervening walls, clearly shown in Figs. 3 and $14^a$, serve as spur gear teeth $85^a$, to actuate the shaft 61 which rotates the rotating guides or rollers 54 and 55. As shown in Figs 11, 12, 14 and $14^a$ the right hand end of such shaft 61 is provided with a pinion 86 which meshes with an idler pinion 87, having end bearings mounted in a bracket 88 pivotally supported upon a housing $89^a$ surrounding the shaft 61 outward of the bracket or hanger 59, whereby the pinion 87 may be swung out of engagement with or into engagement with the teeth $85^a$ produced by forming the slots 84 in the continuous annular periphery $84^a$ of the spider 63, as described. The rotation of the drum G is thereby accompanied by rotation in the same direction, and at a predetermined fixed ratio, by rotation of the shaft 61 and consequent rotation of the rotating guides or rollers 54 and 55.

The continuous annular rim 89 of the spider 64 is slotted in a continuous series radially of the spider, as at 90, producing alternately intervening walls $90^a$. The notches 90 are spanned by a hoop or ring $90^b$, passing completely about the periphery of the spider 64, and the portion of such hoop within such notches registers lengthwise of the drum with the respective notches 84 of the spider 63. In order to produce ways 91 lengthwise of the drum G upon which may be guided adjustable automatically retracted catch hooks 92, I pass about the sections of the hoop $90^b$ in the notches $90^a$, and likewise about the outer ends of the walls $85^a$ of the notches 84, to and fro lengthwise of the drum, to produce spaced radially disposed pairs of courses or stretches or reaches thereof, a suitable length of pliable wire 93 which may thus in one length constitute the continuous annular series of such pairs of wires, and embrace entirely the ways 91 comprising the same. The catch hooks 92 comprise each an elongated body $92^a$, provided with spaced depending bifurcated guides 94 which embrace the wires of each respective pair 93, loosely, so as to permit play of the respective catch hook lengthwise of such pair of wires, but to prevent escape of the catch hook from its ways. $92^b$ designates means acting automatically to retract the respective catch hook toward the spider 63, or toward the right hand of the drum G, the same being specifically disclosed as comprising an elastic band engaged with one of the catch fingers 85 and likewise with a catch finger $92^c$ upon the right hand end of the catch hook body $92^a$.

The co-action of the catch hooks 92 and the partially formed or cord fabric comprising the fabric threads $aa$ and $bb$, and the further co-action of such catch hooks with the rotating guides or pin-carrying roller 54, is as follows:

As the drum G and the roller 54, and in fact both rollers 54 and 55, are rotated synchronously and at the same peripheral speed, and as the catch hooks 92 are all disposed at an equal distance from their respective catch fingers 85, under the retractive influence of the rubber bands $92^b$, and as determined by an annular stop $92^d$ against which the right hand or outermost bifurcated extensions 94 of such catch hooks bear, it results that as the drum G and the roller 54 jointly rotate, the catch hooks will ascend, if so properly normally located, into the region directly to the left of the annular series of pins $54^a$, and preferably in alternation with said pins, although that is not material to the operation about to be described. The partly formed or cord fabric, as clearly shown in Fig. 14, descends from the working zone XX to and is roved about the rollers 54 and 55, the pins $54^a$ and $55^a$ preferably entering the loops of the warp thread $b$, in each case inwardly of the selvage thread $a$. It will equally suffice if said pins engage with the selvage threads intermediate of or alternating with the loops of the warp thread $b$, where they are engaged with the selvage threads $a$. When any one of the catch hooks 92, as described, ascends into position to engage with the selvage threads $a$ in one of said loops of warp thread $b$, or with the selvage thread $a$ between two of such loops of warp thread $b$, and continued rotations of the rollers 54 and 55 and of the drum G ensue, and the partly formed or cord fabric is diverted from the rollers 54 and 55 into its new oblique course under the action of the take-off means D, the respective retreating pin $54^a$ associated or registering with the respective catch hook 92, escapes from the respective warp thread loop or space between two warp thread loops, and such loop or the selvage thread $a$ in such loop or between two such loops is left engaged with and entirely held and retained by such respective catch hook 92; or, it may be said, that the changed course of the partly formed fabric, under the direction of the selvage thread $a$, in effect strips such partly formed fabric from the roller 54 and its pins. The yielding quality of elastic bands $92^b$ permits the catch hooks 92 to advance lengthwise of the drum G, in the described engagement with the selvage thread $a$, as the partly formed fabric pursues its oblique course over and in rolling contact with the drum G, the take-off means D being so timed in relation to the speed of rotation of the drum G that the partly formed fabric and the drum partake of such rolling contact without frictional drag of the partly formed fabric over the wire surface of the drum. This relation is of course maintained by the catch hooks 92 which travel with the rotating drum.

The catch hooks 92 further and further advance toward the left hand end of the drum G as the partly formed fabric pursues its oblique course over the drum, during which period of time the sufficiently advanced partly woven fabric is subjected to the operation of the weft-producing means C at the far left hand end of the drum. This gradual advance of the catch hooks 92 is shown in part in Fig. 15.

To release the loops or the right hand selvage edge of the partly completed fabric, trip means $yy$ are located in such relation to the weft-producing means, that escape of such selvage edge from the catch hooks 92 occurs just previously to the incorporation of the so-held fabric portion in the completed fabric. Such trip means may comprise a wedge-faced or cam-faced finger 95 supported by a suitable bracket 96 directly over that zone of the rotating drum G, and beneath the right hand selvage edge of the partly completed fabric, which registers with such fabric edge just prior to its final incorporation in the completed fabric as described. The bracket 96 may be suitably supported as upon a triangular table 97 over which the completed fabric is caused to pass by the take-off means which will be hereinafter described, as clearly shown in Fig. 2. As the catch hooks 92 are held to a circular path of reciprocation by their mounting upon the drum G, this fixed trip means strips the right hand selvage edge of the partly completed fabric from the successively presented catch hooks 92, whereupon the catch hooks 92 are successively retracted by their rubber bands $92^b$ into engagement with the annular stop $92^d$, so that they normally occupy the positions indicated in Fig. 3.

The rotating guide or roller 55 is more particularly associated with the weft-producing means C, as particularly shown in Figs. 7 and 8, while the rotating guide or roller 54 may be said to be more particularly associated with the warp-producing means A, in that such roller 54 more particularly holds one selvage thread $a$ in extended position for the application thereto of the loops of the warp thread. However, both such rotating guides 54 and 55 perform a function intermediate of the performance of the functions of the warp-and-selvage-producing means and the performance of the function of the weft-producing means. The roller 54, as we have seen, likewise also holds the partially completed fabric extended during the application of the weft threads, in that as between its action and the action of the take-off means the course of movement of the partly completed fabric away from the working zone XX is defined. This action, however, is modified by the action of the weft-forming means, as we shall hereafter see, which action necessitates an accommodation by the catch hooks 92, in their yieldingly mounted capacity, during the successive or alternate formation and collapsing of the shed which permits the throwing of the shuttle-needle for the introduction of the weft threads as between the warp threads.

The rotating guide 55 of the pair of rotating guides which are disposed between the working zone XX of the warp-and-selvage-producing means and the zone of performance of the weft-producing means, is caused to yield up its selvage edge of the partially completed fabric comprising the warp threads and selvage threads, so that adjacent pairs of such reaches or lengths of warp threads may be relatively separated, first in one shed formation and then in the opposite, in order that the shuttle-needle $d$ of the weft-producing means may introduce between such pairs of separated warp thread lengths the pair of weft thread lengths. Disengagement of each such pair of warp threads from the respective pin $55^a$ of the roller 55 by which it has been held either directly or by engagement of such pin with the selvage threads $aa$ next adjacent to the loop of such pair of threads, is produced by cam-operated fingers 98, which are caused to engage successively with successive pairs of lengths of warp threads advanced to them by the roller 55. These fingers are carried to play radially in a circular series, by the spider 64 of the drum G, as shown particularly in Figs. 3, 9, 7 and 8, the peripheral annular rim 89 of such spider being notched radially as at 99 to separately accommodate each of such fingers, which has an elongated body portion $98^a$ carrying an outwardly-facing rectangularly related terminal portion $98^b$, each of which is provided with a straight edge $98^c$ which is the leading edge with respect to the direction of rotation of the drum G and with an upwardly inclined and rounded opposite edge portion $98^d$ merging into said straight edge portion in a point $98^e$. All of such fingers are held in their several notches 99 jointly by an annular retaining plate 100 which is applied to the peripheral rim 89 of the spider 64 over such fingers and held thereto by suitable devices such as pins 101 passed through such plate 100 and into the webs or partitions or walls alternating with the notches 99. These fingers are provided each in its edge portion opposite to the straight edge portion $98^c$ and beneath the upwardly curved edge portion $98^d$ with a suitable warp-thread receiving notch 102, such notch being in the following edge of each finger terminal portion, calculating upon the direction of rotation of the drum G. The said fingers are normally retained in inward position, radially of the spider 64, by suitable compression means or the like, such as a bent length of spring wire 103 each of which is inserted in one of the notches 90 spanned by the hoop $90^b$ which holds the way wires 93 of the drum G, each such notch 90 communicating with and in effect being an extension of the respective notch 99. Such bent wire spring 103 is looped at one end about the hoop $90^b$ as at 104, and at the other end engages with the body portion $98^a$ of the respective finger 98, as at 104, to exert its compression upon the finger. This complete circular series of fingers 98 is cam-controlled, in coöperation with the springs 103, as shown particularly in Figs. 7, 8 and 9, by a cam element $zz$ which in the particular construction disclosed in the drawings is shown as segmental, and if a wider fabric is to be produced on the loom, necessitating a greater path of throw of the shuttle-needle $b$, and the production of a wider shed, the segmental arc of the cam means $zz$ is increased, so that more of the fingers 98 are actuated at a given period of operation. Hand-in-hand with such variation of the segmental extent of the cam means $zz$ would go the widening by adjustment of the distances apart of the rollers 54 and 55, and the further placement outwardly upon the arm 48 of the block 51 carrying the tubular guide 49 for the warp thread. The cam means $zz$, referring particularly to Figs. 3, 6, 7, 8 and 26, in which latter figure the modification of construction is shown consisting in widening the zone of action of the separate cam members to operate two of the fingers 98 simultaneously instead of one, comprise alternately, upwardly and downwardly inclined cam faces 105 and 106, which former inclination being toward the drum G; and the neutral cam zone or surface 107 ranging in a true segment of a circle around the periphery of the sector 108 carrying such cam members, and which in turn is connected by spokes 109, with a hub 110 which surrounds and is fixed to the tubular shaft 78 which is provided with the bushings 79 whereby such tubular shaft 78 is free to be reciprocated endwise upon the tubular shaft 80 in the method and by the means hereinafter described. The drum G is, as will hereinafter be described, intermittently rotated, and the shaft 78 is intermittently reciprocated, its movements in both directions coinciding with periods of rest of the drum G. Thus, with the parts in the positions shown in Fig. 4, the drum G being at rest, the shaft 78 is actuated toward the right, lifting the finger 98 represented as nearest to the eye, and depressing the finger 98 represented as farthest from the eye, this alternate elevation and depression of the fingers 98 being produced throughout that portion of the entire series of such fingers 98 which is co-extensive with the segmental extent of the cam means $zz$; whereby their terminal portions $98^b$ are forced first radially outwardly so that each of the same passes between two pairs of warp threads $bb$, laterally deflecting the same due to the pointed formation of such finger terminal portion, freeing the same from the roller 55 and the pins thereon, so that in the next ensuing action of the cam means $zz$, such pair of warp threads having slipped into the respective notch 102 in the finger, is depressed. Alternate elevations and depressions of the pairs of thread portions $bb$ then ensue, forming the successive sheds through which the shuttle-needle $d$ plays successively to introduce the weft thread length $c$. In order to produce such alternate depression and elevation of each finger 98, it must escape over the neutral zone 107 of the cam means rim 108 from either the inclined surface 105 and pass to the cam surface 106, or vice versa, so that reciprocation of the shaft 78 will cause first the up and then the down movement of each finger 98 in producing the opposite shed structure, as described, a step in rotation of the drum G so carrying each finger over the neutral zone 107. It will be understood that as each pin $55^a$ retreats upwardly from the zone in which the fingers 98 engage with the fabric applied to the roller 55, it is withdrawn from the fabric, so that the fabric is freed both by the finger 98 and such retreating action of the pin. The laterally deflected pair of warp thread portions $bb$ is positively directed away from the roller 55 and the pin engaging any particular portion of the same, by the pointed formation of the terminal portion $98^b$ of the finger, thus wedging such thread portion $bb$ toward the notch 102.

It now remains to treat further of the

*Weft producing means,* referring to Figs. 18, $18^a$, 19, 24 and 25 and which we have stated includes the shed-producing means comprising the fingers 98 and the cam means $zz$ and the shuttle-needle $d$. The shuttle-needle $d$ operates in the operation of the total weft-forming means, in a working zone WW, which zone is defined by the confines of the shed produced by the alternately opposite actuation of the fingers 98 through the agency of the cam means $zz$. The shuttle-needle $d$ plays or reciprocates through the working zone WW within the shed produced by the fingers 98, being directly carried upon a needle arm 111 disposed at the left hand end of the drum G, and provided with a boss or hub 112 surrounding and fixed upon the tubular shaft 82 which is slidably and rotatably mounted upon the central shaft 67 by means of the bushings 83 carried by the same. The needle arm 111 ranges radially from such shaft 82, its outer end being slightly deflected toward the right, and such end or terminal portion or head $111^a$ directly carries the shuttle-needle $d$ which is provided with a curved tubular body 113, the arcuate formation of which corresponds to the segment of a true circle, having a diameter substantially that of the drum G, to the end that such needle may actually play through the working zone WW in the shed formed at the left hand end of such drum and substantially at the periphery thereof. Such tubular body of the shuttle-needle is provided with a tapered leading or outer end portion or tip $113^a$, directly inward or rearward of which and at the left hand side of which is provided a thread outlet or lateral eye $113^b$, such eye only opening at one side of the tubular body and not being a through eye. The tip $113^a$ is preferably arcuate or curved in its formation so as to most freely pass between the warp threads $bb$ in the shed, should it be engaged with any of the same. The rearward end of the needle body 113 is bent both upwardly and laterally, toward the right hand, as at $113^c$, to constitute a tubular thread guide $113^d$ having a trumpet mouth $113^e$ as have other thread guides herein disclosed and of which previous mention has been made, such mouth directly receiving the weft thread $c$ supplied to the shuttle-needle $d$ from a weft thread spool or bobbin 114 mounted upon a standard 115 upon the bed plate 73. This weft thread $c$ when shot into the partially completed or cord fabric comprising the selvage threads $aa$ and warp threads $bb$ becomes the weft thread or weft units $cc$, as clearly shown in Fig. 30, such threads as stated lying angularly with relation to the warp threads $bb$ which with said weft threads are both disposed angularly with respect to the selvage threads $aa$. The weft thread $c$ drawn from the spool or bobbin 114 is carried through the shed or the successively formed sheds, by the needle $d$, being looped temporarily in connection with automatically controlled retaining pins 116 and 117. These retaining pins 116 and 117 are mounted each upon a rocker arm 118 fulcrumed as at 119 beneath a curved table 120 included within the take-off means D and disposed at the left hand side of the drum G. These two rocker arms are actuated each by a connecting rod 121 pivotally connected at one end with the respective rocker arm as at 122 and provided at the other end with a cam roller 123 coöperating with cams 124 and $124^a$ respectively, mounted upon the central shaft 67 actuated by the drive means E. Each such rocker arm 118 at its pin-carrying end is subdivided and provided with a rocker joint $118^a$ so that the subdivisions of said end of the rocker arm may relatively and pivotally play, subject to control of an adjusting screw $118^b$ which determines the degree to which the respective pin may be extended or advanced laterally of the path of the shuttle-needle $d$, to determine ultimately the position at which it shall take the loop of thread $c$ from the needle. These pins 116 and 117 are projected between the table 120 and the drum G, being in fact within the margin of the table 120, by reception in notches or recesses to accommodate them, in a transverse plane just to the left of the path of reciprocation of the needle $d$. The cams 124 and $124^a$ are so formed as to successively project the pins 116 and 117 and to retract them approximately simultaneously, or in any such predetermined relation that a given pair of loops of the thread $c$ formed by the operation of the shuttle-needle $d$ may be released so that the fabric may be advanced by the take-off means D and the pins be available for holding the loops in a succeeding action of the shuttle-needle. The rocker joint at $118^a$ in each of the rocker arms 118 permits such jointed end portion of the rocker arm to buckle, as it were, or to adapt the pin carried by it to ready withdrawal from the loop in the thread $c$, the pin yielding inwardly of the loop due to such jointed formation, when the pin is being withdrawn. The pressure of the loop of the pin tends to rock the outer portion of the jointed end of the rocker arm 118 on the withdrawal of the pin 116 or 117, and the pin is restored to its normal relation to the joint 118ª, by a spring finger 125 bearing upon a stop pin 126 on the outermost portion of the jointed end of the rocker arm and fixed at its other end to a boss 127 upon one side of the rocker arm and at the other side of the rocker joint 118ª.

The weft thread c is fed from the spool 114, in the use of such single thread to the mouth 113ᵉ of the tubular needle thread guide, by the agency of an eye 128 mounted at the outer end of an arm 129 adjustably mounted as at 130 upon a standard 131, and in turn mounted upon the standard 115 which supports the spool 114. This arm 129 is provided with a plurality or series of tension pins 132 about which the thread c is roved, such thread thence passing through the eye 133 in a fulcrum pin 134 whereby a rocker arm 135 is mounted upon the upper end of the standard 131, one end of such rocker arm being connected with an adjustable collar 136 upon the standard 131 by means of a contractile coil spring 137; and the other end of such rocker arm 135, namely, that which is directed toward the thread guide end 113ᵈ of the shuttle-needle, being provided with an eye 128 through which the thread passes after passing through the eye 133, thence extending directly to the guide tube 113ᵈ. The function of the rocker arm 135 and the coöperating spring 137 in controlling the feed of the weft thread c to the shuttle-needle, is to insure the proper feed of a due amount of such thread to form each weft unit cc in the fabric upon a complete excursion of the shuttle-needle d, without over-accumulation of thread supply in the tubular shuttle-needle and likewise without undue drag upon the thread in the shuttle-needle. To that end the rocker arm 135 oscillates under the yielding control of the spring 137, as will be in detail pointed out in the discussion of the complete operation of the loom. Upon the withdrawal stroke of the shuttle-needle d, thread c is drawn through the eye 128 and past the other features between such eye and the spool 114, and over a thread shield 139 which is segmental in form, flanged radially at its right hand edge as at 140, and overlying the drum G, having a diameter slightly greater than the segmental path of the shuttle-needle d, and with a center concentric with that of the shuttle-needle arm 111. This fixed thread shield 139 is mounted upon brackets 141 and 142 whereby it is directly and indirectly connected with the bed plate 73. As the shuttle-needle is withdrawn, or upon its withdrawal stroke, weft thread c is pulled over the shield 139, to a length slightly greater than the length of such weft thread sufficient to extend completely longitudinally within the shuttle-needle, due to the difference in diameters of the path of the shuttle-needle and of the shield 139. This surplus feed of the thread c is accompanied by oscillation of the rocker arm 135, so that the eye 138 thereof is depressed. When the shuttle-needle commences its next stroke inward of the shed, this surplus thread is gradually taken up by the rocker arm 135 and its spring 137, which latter causes the eye 128 to be elevated. This depression of the eye 128 accompanies the entire withdrawal stroke of the shuttle-needle, and its elevation accompanies the entire insertion stroke of the shuttle-needle. It therefore results that at all times the weft thread is kept under tension of the spring 137 which prevents the weft thread from becoming slack so that its misengagement with or lack of definite and proper application to, the retaining pins 116 and 117, is prevented. Likewise, the feed of more thread c, on the withdrawal stroke, than is required to supply the shuttle-needle on the insertion stroke, guarantees the provision of sufficient thread to accompany the insertion stroke and prevents undue strain being imposed upon the leading or outer end of the shuttle-needle, which would occur should there be any deficiency in supply of thread for the shuttle-needle to accompany such insertion stroke. In concluding the present discussion of the weft-producing means C it may be stated that the shaft 67 reciprocates the shuttle-needle d through the shed of one formation resultant upon action of the fingers 98 and then through the shed resultant upon the reverse action of the fingers 98, as controlled by the oppositely inclined cam faces 105 and 106 of the cam means zz, there being a complete excursion of the shuttle-needle d to form a single weft thread unit of two strands or reaches of thread c, to thus constitute a weft thread unit cc for the completed fabric, while each shed formation is preserved by the fingers 98 and their coöperating cam surfaces. These shed formations are alternately produced until the respective warp thread units bb of the cord or partially completed fabric have been entirely supplied with weft thread units cc. When that result has taken place the respective warp threads bb are to be freed from the fingers 98 which have been manipulating the same to produce the shed formations, and to that end I provide trip means vv located adjacent to the trip means yy for disengaging the catch hooks 92 from the selvage cord or thread aa, and operating substantially the same moment that the trip means yy operate, such trip means vv being, as shown in Fig. 7, a thin metallic finger 143 disposed in the path of the warp threads bb when in their elevated shed positions under thrust of the fingers 98. This finger 143 is disposed in the working zone WW between the path of movement of the fingers 98 and the path of movement or play of the shuttle-needle dd. The finger 143 is carried by the bracket 96 which likewise carries the trip means yy which disengage the catch hooks 92 successively from one selvage cord aa of the fabric. This trip means vv engaging with the warp thread unit or pair of thread reaches bb, when in the last position of elevation by the respective finger 98, at the end of the formation of sheds involving such thread unit, strips the thread unit from the respective notch 102 in the finger, whereupon the said thread unit falls to the plane of the material as it is withdrawn by the take-off means D.

After each shed formation and the application of each weft thread unit cc to the fabric, I provide means for pressing such weft thread unit home in the fabric, so as to produce a compact closely woven fabric, such means being herein designated as the

*Comb means*, generally designated by the reference character f, and particularly and clearly shown in detail in Figs. 6 and 9. The action of this comb means precedes the withdrawal of the retaining pins 116 and 117, and the comb means are disposed to the right of the trip means vv. This comb means includes a plurality of comb teeth 144 carried by an annular comb frame 145 supported by radial spider arms 146, the hub 147 of which is fixed on the left hand end of the tubular shaft 80; and the arms 146 are slightly bent adjacent to their outer ends and directly inwardly of the comb frame 145, as at 146$^a$, so as to accommodate the cam segment 108, which is disposed with its arms 109 between the arms 146 and the left hand end of the drum. The comb frame 145 is therefore normally so disposed that the comb teeth 144 which extend in a complete annular series, are disposed just to the left of the series of fingers 98 and just to the right of the vertical plane of the path of the shuttle-needle d; at the same time such teeth being, as to certain of the same, projected between the warp thread units bb so as to bridge the shed closely adjacent to the fingers 98 and leave clearance for the shuttle-needle to play through the shed between such comb teeth on the one side and the edge of the completed fabric on the other side. The comb teeth 144 ascend each into working position under rotation of the comb means. Coöperating with the comb means f is the table 120 heretofore referred to, and which is located with its right hand edge 148 in a vertical plane slightly to the right of the completed fabric edge, or cutting adjacent to the left hand portion thereof the shed produced by the fingers 98. This table, which is shown particularly in Figs. 1, 2, 4, 18, 24 and 29, is curved or arched transversely, so that the axis of its curvature is an extension of the axis of the drum G or of the central shaft 67. Generally speaking, the upper surface of such table lies within a plane triangular field, the apex of which is adjacent to the left hand end of the drum G, and at the rearward portion of such drum. The table 97 heretofore referred to is disposed between the table 120 and the remaining portions of the take-off means, being horizontal and generally triangular, so that the two tables 120 and 97 in continuous extension lie beneath the path of the completed fabric as withdrawn from the weft-producing means C, such path being a straight-away path over the drum G and to the rotary guides or rollers 54 and 55, such path of course being subject to the irregularities, vertically, produced by the curved surfaces of the drum G and of the table 120. This table 120 is provided with downwardly projecting struts or legs 149 which lead to bearings 150 and 151, receiving the shaft 67 or its extension beyond the drum G at the left, such bearings being respectively at opposite sides of the bearing 70 which supports such left hand end of the shaft 67. A collar 152 is held fixed to the shaft 67, to the left of the bearing 151, as by a pin 153, and at the right of the bearing 151 a cam 154 is mounted upon the shaft 67, the same having a hub 155 pinned to the shaft, so that as the shaft is reciprocated the collar 152 and hub 155 will cause the bearing 151 loosely applied to the shaft 67 to move definitely and synchronously with the shaft and carry with it the table 120 in the reciprocation of the shaft, but not in its rotation.

Associated with the table 120, and disposed in a transverse plane cutting the same adjacent to the right hand edge thereof, and slightly removed from such edge, and arching over the transversely curved top of such table 120, is an arcuate fabric-clamping member g which is provided at its ends with bosses 156 through which play bolts 157 squared at their lower ends and mounted to play vertically in keepers 158, beneath which such bolt ends are provided with lateral pins 159 each received within a yoke or jaw 160 on the outer end of a rocker arm 161, such rocker arms being disposed at the respective sides of the table 120 and being fast upon a rocker shaft 162 disposed transversely of the table 120 at the lower portion thereof. Between the bosses 156 and nuts 163 applied to the outer ends of the bolts 157, are disposed coiled compression springs 164, exerting a tendency to depress the clamp member g, through the agency of such springs. Ranging to the left from the rocker shaft 162 is a roller-carrying arm 165, at its outer end having a cam operated roller 166 coöperating with the cam 154 which is so peripherally formed, as shown in Fig. 5, that through the major portion of the rotation of the cam 154 the clamp member g is held down upon the table 120, or the fabric covering the table, so as to clamp such fabric to the table, under compression of the springs 164, being only relieved from pressure against the fabric, and slightly elevated above the same, during a brief period of the rotation of the cam 154, when the roller 166 moves inwardly upon the cam toward its axis, whereupon the roller-carrying arm 165 descends under the action of gravity and the squared lower end of the bolts 157 beneath the bosses 156 causes the elevation of said bosses and of the clamp member g. This clamp member g holds the completed fabric down upon the table 120 during the action of the comb means f, during the action of the fingers 98 to produce and maintain the shed formations, during the action of the shuttle-needle d to apply the weft threads, and during the movement of the table 120 synchronously with the shaft 67 in its endwise movement, in the latter case to cause the feed of the completed fabric toward the stationary table 97.

I may now return consistently to discussion of the comb means f which, as I have said, is inter-related with the table 120 and the clamping member g which coöperates with the same. After each weft thread unit cc has been applied to the fabric by the shuttle-needle d, the comb teeth, between the pairs of warp threads bb, are caused to move toward the table 120 and to force home or into a close compact relation with the completed fabric formation, such last applied unit cc of weft thread. This is accomplished by lengthwise movement of the tubular shaft 80 in the manner hereinafter described. The final phase of this movement of the comb teeth in the general direction of the table is accompanied by movement of the table, in the same direction, and, as the comb means f rotates in step with the drum G, the comb frame 145 being plurally keyed to the retaining plate 100 on the drum, as at 167, as shown in Figs. 14 and 14ᵇ, so as to cause rotation of the drum synchronously with the rotation of the comb frame, while permitting lateral movement of the comb frame independently of the drum, such comb frame being adapted to be rotatively coupled to the table 120 during the final phase of the lateral movement of the comb frame 145 by means of pins 168 arranged in a series on the edge of the table 120 and adapted to receive the comb teeth 144. It results that in such final stage of the lateral movement of the comb means the table 120 will oscillate in step with the rotating comb means, or will cause in its oscillation such rotation of the comb means and resultantly a step rotation of the drum G, and a step rotation of the rotating guides or rollers 54 and 55. While the comb means therefore is in the last phase of its lateral movement in the general direction of the table 120, it is given a step in rotation by said table which moves both lengthwise under the push of the shaft 67 upon the bearings 150 and 151, and is likewise oscillated through the agency of a cam roller 169 rotatively mounted upon a boss 170 upon the bearing 70 and coöperating with a cam 171 bolted to the frame of the table 120, such cam having a diagonally disposed channel 172 with which the roller coöperates to produce rocking movement of the table during its lengthwise movement, as shown in Figs. 4 and 4ᵃ.

Due therefore to the inter-connection of the drum G and the comb means f and the comb means f and the table 120 as last described, a brief statement can now be given of the inter-relations of the various leading features of the weft-forming means and the table 120 which initiates the action of the take-off means D. The shed formations are intermittently produced by the fingers 98, and prior to the insertion and withdrawal movements of the shuttle-needle the comb fingers 144 are closely adjacent to the shed-forming fingers 98.

The retaining pin 116 is now projected by the cam 124, and the shuttle-needle is given its throw by the arm 111, looping the weft thread about the retaining pin 116. The retaining pin 117 is next projected by its cam 124ᵃ and receives its loop of the weft thread c, whereupon the shuttle-needle is given its withdrawal movement by its arm 111. Thereupon the cam means zz cause the collapsing of the shed formation so that the fingers 98 come upon the surface 107 of the cam spider rim 108. The comb means f are now operated in the general direction of the table 120 forcing the weft thread unit cc last applied to the fabric toward the previously formed fabric portion. During all these actions the clamping member g has been held firmly in position to bind the completed fabric against the table 120 by the cam 154 and the agencies between the cam and the clamping member. Thereupon ensues inter-locking of the comb frame through the comb teeth 144 with the table 120 through the agency of the pins 168, and in the last phase of the lateral movement of the comb means, the table 120 is moved jointly with the comb means in the direction of the axis of the shaft 67, and the table 120 is thereupon rocked through the agency of the cam 171 and the roller 169 to cause a step in rotation of the comb means and of the drum G inter-locked with the comb frame by the keys 167. It therefore results that there has been produced an accretion of completed fabric which has been brought over to and upon the table 120 by the operations last set forth, and this is now ready for passage over the said table beneath the clamping member g and to its final disposition through the agency of the take-off means D. Actually, the clamping member g and the table 120 on the return movement of the table produced by suitable means such as a contractile spring 173 extending from the pedestal 71 to a bracket 174 on the bearing 151, travels as to the latter beneath, and the clamping member g travels over, the completed fabric, but the relative movement of the table and the clamping member, on the one hand, and the completed fabric on the other, is such that the completed fabric is advanced in part farther beyond the clamping member g and toward its point of final disposition through the agency of the take-off means D. This return movement of the table 120 in a direction toward the drum G, and of course by oscillation the reverse of the oscillation last previously caused by the cam 171, is not permitted to take place until the comb means f have become disengaged from the table 120 and have returned to normal position adjacent to the shed-forming fingers 98. Obviously if this were not the case the comb means would be given a reverse rotation tending to break or distort or disrupt the warp threads or partially formed fabric, and likewise tending to retract the completed fabric otherwise advanced by the movement of the table 120 in a direction away from the drum, thus preventing the action of the take-off means. This prevention of return movements both by oscillation and endwise play of the table 120, until after the comb means have resumed their normal position consequent upon their return movement, is produced by temporary locking means hh operating with respect to the right hand end of the central shaft 67 through the agency of which both movements of the table 120 are controlled; such temporary locking means being disclosed as comprising a rocker arm 175 fulcrumed by means of a shaft 176 journaled upon a boss or offset 177 upon the pedestal 71, the rocker arm 175 being provided with an adjustable pin or bolt 178 mounted at the free end of such rocker arm and presented to the right hand end of the shaft 67 so as to form a stop therefor as against longitudinal movement in the right hand direction thereof excepting as permitted by the rocker arm 175 subject to the control of a cam 179, the action of which will be hereafter recited. It remains to be stated that the lengthwise movement of the shaft 67, which causes the initial movements of the table 120, both in oscillation and lengthwise, such lengthwise movement being away from the drum G, is produced not by the teeth 144 of the comb means upon inter-locking with the table 120 for purposes of joint rotation, but through the agency of the hub 147 of the comb frame spider which engages with the hub 112 which carries the shuttle-needle arm 111 and which is thereupon brought to bear upon the hub of the cam 124$^a$ fixed to the shaft 67 and in turn bearing upon the bearing 150 fixed to the table 120, whereby such table is set into motion. As clearly shown in Fig. 4, normally the hub 112 is spaced appreciably from the hub of the cam 124$^a$, which permits the comb means to execute the first part of their lateral movement away from the drum G prior to the inter-locking of the comb means with the table 120 for that joint step rotation of said two means which ensues when the shaft 67 is set into endwise motion to set the table 120 into motion as last described. With the comb means restored to their normal position as shown in Fig. 4, and the table likewise restored to its normal position, the clamping member g having been temporarily relieved from pressure upon the fabric upon the table so that the take-off means D might retain such fabric, the cam 154 now acts to restore the pressure of the clamping member to the fabric, whereupon may again ensue shed-forming action of the fingers 98, a warp thread applying action of the shuttle-needle d, a further lateral movement of the comb means f and a further joint action of the table 120 and its clamping member g, together with the comb means f and the drum G. It remains to be stated that the retaining pins 116 and 117 were withdrawn from the loops of the respective weft thread unit forced home by the comb teeth 144 directly after the completion of the return movement of the comb means f and prior to the return movement or movements of the table 120. As soon as the table 120 has returned to normal position the clamping member g is brought into engagement with the fabric to firmly hold it to the table.

It remains now next in order to discuss the further action of the.

*Take-off means D* which include the tables 97 and 120, the completed fabric traversing said tables and ultimately being received and wound upon a drum 180.

The completed fabric supplied to the table 120 and permitted to traverse the same, as above described, eventually passes beneath a guide bar 181 which has a curved belly or lower surface 181$^a$ arranged closely adjacent to the edge of the table 120 contiguous to the table 97, such guide bar being located to overlap the slight space between such tables and being held in position by end brackets 182 which are secured to the sides of the table 97. The latter table is supported upon a central pedestal 183 mounted upon the bed plate 73 and its upper or operative surface lies in a horizontal plane, the fabric being drawn over this surface by the means which operate the drum 180 of the take-off means D. Prior to passing to such drum, however, the fabric is passed into engagement with a variable feed compensating device $ll$ whereby the fabric intermittently supplied to and passed over the tables 120 and 97, subject to the joint action above described of the table 120 and the clamping member $g$, is evenly or at a fixed rate fed to the drum 180. This variable feed compensating device is clearly shown in Figs. 28 and 29, as also in Figs. 1 and 2, and comprises a pair of spaced vertically disposed rocker arms 184, between which at their upper ends extends a roller 185, such rocker arms being fulcrumed approximately centrally, as at 186, in spaced standards 187, and a further roller 188 being disposed between said rocker arms 184 and journaled in the axis of oscillation of the rocker arms 184. A tie bar 189 connects the upper ends of the rocker arms 184, and tension means shown as a contractile coil spring 190 extends from each of the rocker arms 184 to a suitable anchorage 191 upon the bed plate 73 and between the standards 187 and extending toward the table 120 so that the action of such springs is to urge the lower ends of the rocker arms 184 toward the table 120, and the upper ends thereof with the roller 185 away from the table 120 and the table 97. The fabric, the complete production of which incident to the operation of the several features of the loom we have heretofore described, may now be designated as a completed fabric by the general reference character H. This, as we have seen, is drawn under the guide bar 181, is caused to traverse the table 97, and is then passed over the roller 185 of the variable feed compensating device $ll$, the upper course of travel of which roller is in the plane of the top of the table 97, and is passed downwardly and around the roller 188, on the side thereof remote from the drum 180, then under such roller 188 and to the drum 180. This movement of the fabric H is produced by rotation of the drum 180 which, in the specific showing of the drawings, is caused through joint operation of the roller 188 and the drum 180, such roller 188 having a shaft or end bearings in the standards 187 to which is applied one member 192 of a friction drive, the other member being 193, and which former member is provided with peripheral sprocket teeth 194 to which is applied a sprocket chain 195 likewise engaged with a sprocket wheel 196 upon a stub shaft 197 which finally drives the drum 180 through its gudgeons or bearings subject to regulation by a friction disk 198 upon the stub shaft 197 and operating to vary the degree of frictional engagement of such parts. The friction drive member 193 consists of a friction pulley mounted upon a short shaft $193^a$ mounted in bearings $193^b$ and $193^c$ upon standards $193^d$ and $193^e$ mounted upon the bed plate 73. This shaft $193^a$ carries a worm gear $193^f$ as shown in Fig. 1 and which meshes with a worm $193^g$ upon the left hand end of the central shaft 67. Applied to the shaft $193^a$ is an adjusting wheel $193^h$, which is operatively connected through the shaft $193^a$ which is tubular and slotted, as shown in Fig. 2, so that the friction pulley 193 may be adjusted lengthwise of the shaft, in the manner readily understood without further discussion, for the purpose of varying the relative speeds of rotation of the shaft $193^a$ and the roller 188. The worm $193^g$ is feathered upon the shaft 67 so that such shaft may move endwise in the manner and for the purposes stated. By its rotation it operates the shaft $193^a$, also the retaining fingers 116 and 117 through the cams 124 and $124^a$, and the clamping member $g$ through the cam 154.

The speed ratio between the roller 188 and the drum 180 is such that the latter rotates slightly faster than the former when the first courses of fabric H are wound onto the same, whereby a positive pull will always be exerted upon the fabric H, in the increasing bulk of the material taken up on the drum 180, the slippage permitted by the friction devices including the drum 180 and its driving element 196 protecting the fabric against breakage and accommodating such varying thickness of the roll of material upon the drum. The drum may be provided with end flanges 199 to assist in guiding and retaining the fabric thereon. Such drum 180 is rotatably supported by end bearings or gudgeons above mentioned in standards 200 upon the bed plate 73. The drive of the features of the take-off means last described will be stated hereafter. At this point it may be stated that the action of the compensating device $ll$ is such that the fabric passed about the roller 188, the center of which remains fixed, moves at a constant rate, so that it may be taken up at a constant rate by the drum 180; while the fabric passed to the roller 185 is received thereby intermittently or at a varying rate, and this varying rate is translated into the constant rate last mentioned by the accommodating action of the roller 185 the axis of which shifts, due to the rocking of the arms 184, all as controlled by the tension of the springs 190 which rock said arms in accordance with the varying feed to the roller 185.

The guide bar 181 is employed in lieu of a roller, as it is obvious that the guide bar extending obliquely over the course of the fabric would tend to shunt the fabric off to one side due to its frictional engagement with the fabric and its rotation; or, the engagement of the fabric with such roller would tend to brake the action of the roller. In any event the tendency would be to distort the fabric or to retard its smooth passage to the compensating device $ll$. The guide bar flattens the fabric down onto the table 97 after its traverse of the arched or curved table 120, so that instead of passing to the roller 185 in the transversely arched form it passes to said roller in flat plane extension.

*The operating or drive means E,* as to the features thereof not heretofore specifically disclosed and described, and coming now to a consideration of the remaining leading and controlling features and elements thereof, are organized as follows with the functions to be stated:

The tubular shaft 80 upon one end of which is mounted the hub 147 of the spider carrying the comb frame 145, is given its endwise movement to impart endwise movement to the shaft 82, as described, to bring the hub 112 of the needle arm 111 against the cam $124^a$ to impart motion to the table 120, by means of a thrust collar 201 mounted upon the right hand end of said shaft 80 and actuated through a ring 202 applied to an annular thrust ball-bearing raceway 203 upon the collar 201, and bearing pins 204 upon the ring are applied the ends of a yoke 205, such yoke being included in the formation of a lever 206 one end of which has a loose pin and slot mounting at 207 upon the bed plate 73 and the other end of which carries a roller 208 which coöperates with a cam channel 209 cut in a cam body 210 fixed to a cam shaft $210^a$, journaled in bearings 211 upon the bed plate 73. This shaft $210^a$ is driven by gear teeth 212 upon a cam body 213, likewise fixed to the shaft $210^a$, such teeth meshing with the teeth of the spur gear 68 which is keyed upon the central shaft 67 as clearly shown in Fig. 3. The gear 68 is driven by a pinion 214 upon a counter-shaft 215 mounted in bearings 216 upon the bed plate 73, such counter-shaft 215 carrying a fixed spur gear 217 which meshes with a pinion 218 on the shaft of an electric motor or the like, constituting the prime mover $e$, all as clearly shown in Figs. 1 and 2. This reciprocation of the shaft 80 operates the comb means $f$.

The tubular shaft 78 which carries the hub 110 of the cam sector 106, is given an endwise reciprocation to alternately raise and lower the fingers 98 of the shed-forming means by their passage over the oppositely inclined cam faces 105 and 106, by means of a collar 219 fixed to the right hand end of the shaft 78 and carrying bearing pins 220, to which are applied a yoke 221 embraced within the formation of a lever arm 222 having a loose pin and slot connection as at 223 at one end with the bed plate 73 and at the other end carrying a roller 224 coöperating with a cam groove 225 cut in the cam body 210 heretofore referred to and fixed to the cam shaft $210^a$ rotated by means of the gear teeth 212 and the teeth of the meshing gear 68. The shaft 78 is prevented from rotation by the yoke 221 and its connection with the collar 219.

As clearly shown in Fig. 3, a material space is provided normally between the collars 201 and 219 to the end that the tubular shaft 80 may reciprocate endwise, through the action of the collar 201, and so that the shaft 78 may reciprocate endwise, through the action of the collar 219. However, the throw of the shaft 78 to the left, reading upon Fig. 3, is limited by engagement of the collar 219 with the hub extension 74 of the drum spider 63. Its movement in the opposite direction is limited by contact of the hub 110 of the cam sector 106 with the hub of the drum spider 64.

The reciprocation of the shaft 82 shifts the hub 112 of the shuttle-needle arm 111, which occurs pursuant to engagement of such hub by the hub 147 of the cam means $zz$, in order that motion may be imparted to the table 120 through the cams 124 and $124^a$ on the shaft 67 which become engaged with and move the loose bearing 150 connected with such table 120, and in order that the shuttle-needle $d$ may be moved laterally so that the complete circular series of comb teeth 144 may be laterally moved in the combing action. It now remains to be described in what manner the shuttle-needle arm 111 is given its movement to cause the insertion and withdrawal movement of the shuttle-needle $d$. This is caused by a pinion 226 fixed to the right hand end of the tubular shaft 82, as clearly shown in Figs. 2 and 3, and meshing with a toothed sector 227 mounted to oscillate upon a boss 228 offset from the standard 71, such sector being oscillated by an adjustably-applied connecting rod 229 extending to a lever arm $229^a$ fulcrumed upon a boss $228^a$, and provided with a cam roller 230 which coöperates with the cam body 213 and a face groove 231 therein, as shown particularly in Figs. 3 and $3^a$.

The central shaft 67 is, as above described, constantly rotated by means of the spur gear 68 fixed to the same as shown in Figs. 2 and 3.

Reference has previously been made to the operation of the rocker shaft 176 which is timed so that the rocker arm 175 with its adjustable stop 178 may release the shaft 67 for endwise movement to permit the spring 173 to return the table 120 to normal condition.

This shaft 176, as stated, is controlled by a cam 179 which is mounted upon the cam shaft 210ᵃ, as shown in Fig. 2. This shaft likewise carries another rocker arm 232 which is provided with a cam roller 233 operating in a peripheral cam groove 234 in the cam 179. Resultant upon this construction, as the cam 179 is rotated by the cam shaft 210ᵃ, the rocker arms 175 and 232 are jointly oscillated and the proper movement at the proper time is given to the adjustable stop 178 to release the shaft 67 for the purpose above stated.

The shaft 47 shown particularly in Figs. 1 and 11 and which drives the tubular shaft 44, is driven by a sprocket wheel 234, driven by a sprocket chain 235 coöperating with sprocket teeth 236 formed upon the cam body 210 which is driven by the cam shaft 210ᵃ. *tt* in Fig. 3 designates temporary locking means for holding the drum against rotation after each of its successive steps in rotation, the same comprising a bell crank lever 237 which is fulcrumed as at 238 and supported above the bed plate 73, so that one of the bell crank levers, namely, 237ᵃ, is disposed in the path of the collar pin 205, the other end 237ᵇ of such bell crank lever carrying a tooth 237ᶜ which normally is engaged with the teeth 85 upon the walls 85ᵃ between the notches 84 in the rim 84ᵃ of the spider 63. When the yoke 205 is moved to the left to endwise move the tubular shaft 80 which carries the comb means *f*, thereby to resultantly move the table 120 as above described, and cause a step in the rotation of the drum G, as above described, the tooth 237ᶜ is retracted from its position between two of the teeth 85ᵃ, and the drum is permitted to take its step in rotation. Obviously this tooth will be restored to the aforesaid locking position when the yoke 205 is moved in the opposite direction, to bring the comb means *f* back into normal position and out of engagement with the table 120.

The operation, method of use and advantages, and law of operation of the loom, will be readily understood from the foregoing description taken in connection with the accompanying drawings and the following statement:

In the use and operation of the loom embodying the invention and specifically constructed and organized as set forth in the foregoing description and as depicted in the accompanying drawings, and from a consideration of which use and operation the significance of the invention may be gathered, without any limitation to such specific loom organization or the operation thereof, and which operation may be continuous subject to such cessation as may be caused or required in the event that any thread breakage or mis-adjustment or failure of parts or features occurs, although the loom is particularly constructed and designed to avoid such untoward occurrences, the selvage threads *a* are continuously supplied to the warp-producing means B, together with the warp thread or threads *b*, and the weft thread or threads is continuously supplied to the weft-producing means C. It will be understood that the selvage-producing means A directly receives the selvage threads *a*, and that the warp threads *b* are associated with the same to produce the partially completed or cord fabric, in the action of the warp-producing means B. The selvage threads *a* are laid directly to and about the rotating guides or rollers 54 and 55, and the warp threads *b* are wrapped or looped or laid about the selvage threads *a* in the rotation of the arm 48 carried by the tubular shaft 44 and rotated by the intermeshing bevel gears 45 and 46 rotated by the shaft 47 of the operating means E. As the cord fabric is progressively produced, the selvage threads *a*, which become the selvage units *aa*, *aa*, of the fabric, engaging with the rollers 54 and 55 outward of the pins 54ᵃ and 55ᵃ, or in such relation that the pins of both rollers are disposed between such selvage cords *aa*, *aa*, the warp threads or portions of the respective warp thread units are caused at their loops where they are passed about the selvage threads to be looped upon such pins, or such loops may be disposed in alternation with the pins which may directly engage the selvage threads. These pins are so disposed or relatively spaced upon each roller that a pair of thread lengths will be accommodated between each two adjacent pins, and such thread lengths may be those of the same looped warp thread unit or may comprise each one length of two adjacent warp thread units. The procedure whereby these warp thread loop units each of two lengths or courses of warp thread are brought, with the selvage threads associated therewith, onto the rollers 54 and 55 and into engagement with the pins thereon, so as to be readily disengaged from said rollers, by the catch hooks 92, with respect to the pins of the roller 54, and by the shed-forming fingers 98 of the weft-producing means C, is such that these actions occur coincidently, and so that each warp thread unit consisting of two lengths or courses is disengaged from the two rollers approximately as a unit. It will be understood, however, that absolute coincidence of removal of the looped ends of such two unit threads or the opposite ends of such thread units which enter into other loop formations, by which unit is joined to unit, is not material to perfect operation, it being only required that those portions of the fabric within a certain longitudinal dimension which are brought to the lower courses of rotation of the two rollers are to be freed therefrom at approximately the same time, so that the fabric may evenly commence its travel obliquely from said rollers over the drum G and the tables 120 and 97.

The action of the catch hooks 92 which are mounted to play automatically lengthwise of the drum G in the respective ways 91, formed by adjacent and radially related lengths of the drum wires 93, has been specifically described, it resulting that each catch hook engages with the selvage units *aa* which are applied to the roller 54 in one of the warp thread loops or between two adjacent warp thread loops, being normally so disposed by the stop means 92$^d$ as to be in position to become engaged with such thread formation and to retain the same independently of the roller as the roller continues its rotation. At the other roller 55 the two strands or lengths of a given warp unit are disengaged from the roller 55 and its pins by the shed-forming fingers 98 which, as has been in detail described, particularly in connection with the description of the features shown in detail in Fig. 7, are successively, in the rotation of the annulus 89 upon the spider 64, brought into engagement respectively with the adjacent pairs of lengths or courses of such warp threads, and such pairs of warp thread lengths become positively associated with the respective fingers 98 in the notches 102 therein in the terminal portions 98$^b$ thereof, such pairs of thread lengths or courses being relatively separated by the curved portions 98$^d$ and pointed extremities 98$^e$ of such terminal portions of such fingers, as clearly shown in Figs. 7 and 9. These fingers 98 are thus relatively actuated, to produce alternate radial projection and retraction, by the cam means *zz*, in the manner specifically hereinabove set forth under control of the cam slot 225 and the lever arm 221. When the warp unit lengths *bb* are thus engaged with the fingers 98, the roller 55 in its continued rotation withdraws its pins 55$^a$ from such warp thread units and the selvage thread units *aa* associated therewith, the warp thread units or pairs of warp threads of such units remaining upon the relatively separated fingers so as to form the shed for the insertion and withdrawal operation movements or excursions, of the shuttle-needle *d* of the weft-forming means C. It will be understood that the association of the warp threads with the selvage threads occurs in or at the working zone XX, and that after such association the partially completed fabric so organized accompanies the rollers 54 and 55 in a certain arc of their rotation, which is caused by the shaft 61 and the bevel gears 62$^a$ and 62$^b$, and 61$^a$ and 61$^b$, such shaft being driven by the pinion 86 and by the drum G as described. It will be understood that at this phase of the operation, namely, when the partially completed fabric is withdrawn from the rollers 54 and 55 and engaged with the catch hooks 92 and the shed-forming fingers 98, the partially completed fabric is given an oblique distortion with respect to its direction of subsequent travel, and such distortion furthermore alters the lie or relative directions of extension of the selvage threads and warp threads, as clearly shown in Fig. 15, so that subsequently the warp threads *bb* extend at angles other than those of 90 degrees with relation to the selvage threads *aa*, such angle being preferably that of 45–135 degrees at each end of such warp thread unit. This distortion, controlled by the take-off means D and the course of travel given thereby to the partially completed and subsequently completed fabric, so relatively disposes the warp thread units and the selvage thread units, that the weft threads may be applied to the partially completed fabric at right angles with the warp thread units, and obliquely transversely of the partially completed fabric or its course of travel, so that the weft threads are applied likewise at angles of 45–135 degrees to the selvage cords, and a true balanced bias formation of the resultant completed fabric is produced.

The shed formation having been produced as described, the remaining features of the weft-producing means are to be considered in connection with the throwing of the weft thread or threads *c* into the partially completed fabric, between the separated warp thread units *bb*. As we have seen, the shuttle-needle arm 111 is rotated by means of the tubular shaft 82 and the pinion 226, the toothed or geared cam 213 being formed to impart an intermittent oscillation to such arm 111 and the shuttle-needle *d* carried thereby. Said shuttle-needle is given its insertion and withdrawal movements, with respect to the partially formed fabric in shed formation, first through one shed formation and then through a succeeding reverse shed formation, and the needle loops the weft thread or threads *c* at the beginning of its insertion stroke about the retaining pin 116, if there be but a single weft thread *c* or about a plurality of such retaining pins if there be a plurality of such weft threads, such retaining pin or pins being projected beyond the upper surface of the table 120 by the cam 124 which is rotated by the shaft 67, in turn rotated by the gear 68, and which shaft, as we have seen, is capable of endwise movement. This projection of the retaining pin or pins 116 occurs just prior to the commencement of the insertion stroke of the shuttle-needle, the cam 124 being properly timed with relation to the operation of the gear 226 to rotate the hollow shaft 82 by means of the cam 213. The weft thread c is engaged with such retaining pin 116 as the shuttle-needle gets under way in its insertion stroke, such being clearly shown in Fig. 21, and the shuttle-needle playing in the working zone WW. When the shuttle-needle has executed its insertion stroke, it passing freely and without obstruction through the shed aided if needs be by its tapered or pointed leading end 113ª, it commences its withdrawal stroke, just prior to which moment the retaining pin 117 is projected slightly beyond the upper surface of the table 120, as clearly shown in Figs. 18 and 24, in the use of a single weft thread c, and two of such retaining pins 117 are similarly and simultaneously projected in the case of the use of two weft threads, as in Figs. 23 and 25, and the plurality of such pins 116 and 117 always equals in number the plurality of such weft threads. This retaining pin 117 is so projected by the operation of the cam 124ª which is properly timed with relation to the operation of the needle arm 111 through the agency of the cam 213 as aforesaid. As above pointed out the remaining pins 116 and 117 are each separately mounted, or each plurality of such pins 116 or such pins 117 are mounted separately, upon a rocker arm 118, as clearly shown in Figs. 24 and 25, jointed as at 118ª, so that in the retraction of such retaining pins the outer end portion of the rocker arm carrying the pin or pins may yield as against the spring 125 and permit the pin or pins to recede from the thread units of the fabric in a direction strictly radial of the table 120, accommodating bind of the threads of the fabric upon it and thus preventing fracture or injury of the threads. The throw of the outer end of each rocker arm 118 or the degree of projection of the retaining pin or pins carried thereby, is determined, as we have seen, by the adjusting device 118ᵇ operating to relatively adjust the end portions of said rocker arm. Likewise as we have seen, the weft thread c is fed to the tubular shuttle-needle body 113 at its trumpet mouth 113ᵉ by a tension device including the rocker arm 135, oscillation of which is resisted by the spring 137, and over a flanged shield 139, curved to an arc concentric with that of the path of play of the shuttle-needle d but having a radius greater than such path, whereby more thread is withdrawn from the bobbin 114 upon the withdrawal stroke of said shuttle-needle than is used on its insertion stroke, thus permitting the tension device rocker arm 135 to oscillate and take up the difference as between such thread supply and that utilized in the insertion stroke, thereby subjecting such thread to a positive and uniform tension during such insertion stroke.

As we have above pointed out, the retaining pins 116 and 117 hold the respective portions of the fabric or the weft thread units of the fabric to which the same are applied, during the action of the comb means f, which serve to compact the fabric, or to aggregate with the previously formed completed fabric the weft thread units so held by the retaining pins. Such comb means, comprising the continuous annular series of comb teeth 144, are operated by means of the spider arms 146 and their hub 147 which is fast upon the tubular shaft 80 and which in turn is reciprocated by means of the collar 201 and by means of the yoke 202 operated by the cam groove 209 in the cam body 210 mounted upon and rotated by the shaft 210ª. The comb teeth rotate synchronously with the drum G by means of the splines, keys or feathers 167, and, being forced to the left in a direction away from the drum G, effectively press home with the completed fabric or unite therewith or closely assemble therewith the last accretion of weft thread units cc. In the last phase of such operation, the teeth 144 of the comb inter-engage with the pins 168 seated in the right hand edge of the table 120, inter-locking the comb teeth and their carrying spider with the table 120 in oscillating couple, so that the drum G, the comb means and the table may jointly perform a step in rotation within the drum G, during the endwise movement of the table 120 in a direction away from the drum G, for the purpose of giving a step in further advance of the completed fabric toward the remaining features of the take-off means D, while such fabric is held to the table by the clamp member g. Thus the drum is given its intermittent steps in rotation by the last described action of the table 120, such actuation of the drum being imparted through the comb means f, as described.

In each step in rotation so intermittently taken by the drum G the catch hooks 92 are successively brought into engagement with the selvage thread unit aa, and such catch hooks are farther advanced in their ways lengthwise of the drum as the uncompleted fabric diagonally traverses the drum. Likewise, in each such intermittent rotative step of the drum, the catch hooks 92 having completed their movements lengthwise of the drum, or, conversely, the partially completed fabric having advanced obliquely over the drum approximately to the left hand end thereof, such catch hooks are successively released from the selvage element aa at the respective edge of the partially completed fabric by the trip means yy, which successively elevates the warp unit loops from such catch hooks, which are retracted by their rubber bands 92ᵇ and brought to bear against the stop means 92ᵈ as shown in Fig. 3. The trip means yy is shown in Fig. 2 and in Fig. 7. Likewise this step-by-step rotation of the drum G brings eventually each shed-forming finger 98 into such position relative to the trip means vv shown in Fig. 7, that such trip means can operate upon the pair of warp thread unit strands in the notch 102 in said finger, to eject the same from such notch due to such rotative action of the drum, and permit such thread strands to fall into the general plane of the fabric.

It now follows that the cams 124 and 124ª operate to retract the retaining fingers 116 and 117, and the collar 201 is operated to lengthwise move the shaft 80 and disengage the comb teeth 144 from the pins 168 on the right hand edge of the table, the comb means being thus restored to their normal position in or at the working zone WW, as shown in Fig. 9. The table 120 may now move to the right or to its normal position, prior to which action the clamp member g is slightly elevated by means of the cam 154 and the rocker arm 165 and its roller 166, so that the table 120 and clamp member may conjointly move to the right without drawing back or putting tension upon the completed fabric last passed to the left by the joint movement of such table and clamp member, to be taken up by the remaining features of the take-off means D. The movement of the table 120 and its clamp member to the left was accomplished as we have earlier seen, by the hub 147 of the comb means engaging with the hub 112 of the shuttle-needle arm 111 and forcing such hub against the cams 124 and 124ª to move the shaft 67 longitudinally toward the left and resultantly move the bearing 150 toward the left, causing the cam 171 to be operated by the roller 169, so as to give the table such oscillation and movement to the left. This action moves the shuttle-needle d out of the path of the annular series of comb means teeth 144. Now, preparation thereunto having been made by raising the clamp member g as described, the table 120 is given movement toward the right, and in a return oscillation, to bring the table to normal position, by means of the spring 173 operating upon the bearing 151 fixed by means of the bracket 149 to the table. This is permitted by the withdrawal of the stop 178 from the position shown in Fig. 3, in which position such temporary locking means hh including such stop has been held to prevent such return endwise movement, by the cam 179 operating through the coupled rocker arms 232 and 175 joined by the shaft 176. Now, such cam 179 is operated by the shaft 210ª and the stop 178 withdrawn to permit such lengthwise movement of the shaft 67 to accommodate the return movement of the table 120 to its normal position as shown in Fig. 4, as above recited.

The last accretion of completed fabric passed over the table 120 in due course of time passes beneath the guide bar 181, any such portion of fabric brought beneath such guide bar being flattened out upon the table 97, and thence passing, as shown in Figs. 2, 28 and 29, across such table 97 under the actuation of the roller 188 and the drum 180, which, as we have seen, are operated together by the sprocket chain 195 driven by the friction transmission members 192 and 193. The fabric is ultimately taken up on the drum 188, and as the diameter of the fabric roll thereon increases slippage is permitted as between the roller 188 and the drum 180 by the friction device upon the shaft end 197 which is applied to the drum 180. The fabric, as we have seen, is fed at a constant rate to the drum 180 by the compensating tension device including the rocker arms 184 and the spring 190 and the roller 185.

The temporary locking means tt are, as we have seen, controlled in the action of the collar pin 204 on the tubular shaft 80 which in turn operates the comb means f, so that the drum G is freed for a step in rotation when the comb means are thrown into engagement with the table 120 for joint movement therewith and the resultant causation of a rotative step with respect to the drum G. When the comb means are retracted from the table 120, the temporary locking means tt is permitted to resume its normal position to prevent rotation of the drum G, as shown in Fig. 3.

It will be manifest from the foregoing statement of operation that the loom is capable of continuous operation to produce first a cord fabric and finally a warp and weft fabric of permanent bias form, with a selvage edge preventing stretch of the fabric longitudinally and capable of and adapted for the many uses and purposes, such as the building up of tire bodies, all as hereinabove initially set forth. It will be manifest that if desired the cord fabric produced by the warp-producing means, and prior to its oblique direction from the rotating guides 54 and 55 and therefore prior to its oblique distortion as described, may be taken off from such rollers in any desired manner and utilized as a cord fabric or a fabric without the weft threads. The entire loom is relatively simple in construction, when its many and peculiar characteristics are considered, and the possibility of its speedy and continuous operation for the production of the peculiar weave resultant upon its operation is taken likewise into consideration with the nicely balanced coordination of its several elements and features. It is likewise obvious that many alterations may be made in the provision, construction, combination, association and inter-relation of parts, members and features herein shown and described and discussed, in adapting the loom and its various features and elements to varying conditions of use and service, and for the production of fabric of different weaves and patterns, all without departing from the true spirit of the invention and a fair interpretation of the following claims.

Having thus disclosed my invention, I claim and desire to secure by Letters Patent:

1. A loom, comprising means for supplying edge threads to extend longitudinally of a fabric, means for associating a warp thread therewith, means for distorting the initial relation between such edge threads and such warp thread, and means for associating a weft thread with such warp thread, whereby the resultant angularity of the courses of warp thread and weft thread to the longitudinal edge threads will be each less than 90 degrees.

2. A loom, comprising means for supplying edge threads to extend longitudinally of a fabric, means for associating a warp thread therewith, means for distorting the initial relation between such edge threads and such warp thread, and means for associating a weft thread with such warp thread, whereby the resultant angularity of the courses of warp thread and weft thread to the longitudinal edge threads will be each less than 90 degrees, and the angularity of the weft thread courses to the warp thread courses will be substantially 90 degrees.

3. A loom, comprising means for supplying selvage threads, means for associating warp threads with such selvage threads whereby the selvage threads are disposed longitudinally at the side edges of the resultant fabric, and means for associating weft threads with the warp threads whereby the weft threads and the warp threads are disposed each in courses having an angularity with the selvage threads of less than 90 degrees.

4. A loom, comprising means for supplying selvage threads, means for associating warp threads with such selvage threads whereby the selvage threads are disposed longitudinally at the side edges of the resultant fabric, and means for associating weft threads with the warp threads whereby the weft threads and the warp threads are disposed each in courses having an angularity with the selvage threads of less than 90 degrees, and whereby the weft thread courses and the warp thread courses are related respectively at an angularity of approximately 90 degrees.

5. A loom, comprising means for supplying selvage threads, means for associating warp threads with such selvage threads whereby the selvage threads are disposed longitudinally at the side edges of the resultant fabric, and means for associating weft threads with the warp threads whereby the weft threads and the warp threads are disposed each in courses having an angularity with the selvage threads of less than 90 degrees, and whereby the courses of warp thread embrace in terminal loops the selvage threads.

6. A loom, comprising means for supplying selvage threads, means for associating courses of warp threads therewith, and independent means for associating courses of weft threads with the warp threads and selvage threads during the feed of the latter, to produce a bias fabric with the selvage threads extending longitudinally at the side edges thereof, the warp threads and weft threads being both independent of the selvage threads and arranged in an angular arrangement thereto.

7. A loom, comprising means for supplying selvage threads, and means for associating courses of warp thread and courses of weft thread with the selvage threads to produce a bias fabric with the selvage threads extending longitudinally at the side edge thereof and with the courses of warp thread embracing in terminal loops the selvage threads.

8. A loom, comprising means for supplying fabric-edge threads to extend longitudinally of the fabric as produced, means for associating a warp thread with said fabric-edge threads, guide means to and about which the so partially completed fabric is fed, means for withdrawing such partially completed fabric from said guide means in a direction oblique with respect to the plane of travel of such partially completed fabric to said guide means whereby such partially completed fabric is distorted to produce an angular relation between such fabric-edge threads and the courses of said warp thread of less than 90 degrees; and means for associating courses of weft thread with said courses of warp thread in angular relation to said fabric-edge threads likewise of less than 90 degrees.

9. A loom, comprising means for supplying fabric-edge threads to extend longitudinally of the fabric as produced, means for associating a warp thread with said fabric-edge threads, guide means to and about which the so partially completed fabric is fed, means for withdrawing such partially completed fabric from said guide means in a direction oblique with respect to the plane of travel of such partially completed fabric to said guide means whereby such partially completed fabric is distorted to produce an angular relation between such fabric-edge threads and the courses of said warp thread of less than 90 degrees; and means for associating courses of weft thread with said courses of warp thread in angular relation to said fabric-edge threads likewise of less than 90 degrees, and whereby an angular relation between said courses of warp thread and said courses of weft thread of substantially 90 degrees is produced.

10. A loom, comprising means for supplying fabric-edge threads to extend longitudinally of the fabric as produced, means for associating a warp thread with said fabric-edge threads, rotating guide means to and about which the so partially completed fabric is fed, means for withdrawing such partially completed fabric from said guide means in a direction oblique with respect to the plane of travel of such partially completed fabric to said guide means whereby such partially completed fabric is distorted to produce an angular relation between such fabric-edge threads and the courses of said warp thread of less than 90 degrees; and means for associating courses of weft thread with said courses of warp thread in angular relation to said fabric-edge threads likewise of less than 90 degrees.

11. A loom, comprising means for supplying fabric-edge threads to extend longitudinally of the fabric as produced, means for associating a warp thread with said fabric-edge threads, rotating toothed guide means to and about which the so partially completed fabric is fed, means for withdrawing such partially completed fabric from said guide means in a direction oblique with respect to the plane of travel of such partially completed fabric to said guide means whereby such partially completed fabric is distorted to produce an angular relation between such fabric-edge threads and the courses of said warp thread of less than 90 degrees; and means for associating courses of weft thread with said courses of warp thread in angular relation to said fabric-edge threads likewise of less than 90 degrees.

12. A loom, comprising means for supplying fabric-edge threads, means for associating courses of warp thread therewith and producing terminal loops in said courses to embrace said fabric-edge threads, spaced rotating guides one of which is provided with a series of teeth and to which guides such partially-formed fabric is fed with the teeth of said toothed guide engaging the same at said fabric-edge threads, means for withdrawing said partially-formed fabric from said guides in a path oblique to that of the feed of said partially fed fabric to said guides, and means for associating courses of weft thread with said courses of warp thread; in combination with a movable carrier, and a plurality of separate automatically retracted means movably mounted upon said carrier, and means normally maintaining each of said last named means in position to be successively engaged with said partially-formed fabric at said tooth guide and to temporarily hold such partially-formed fabric during a phase of its movement in withdrawal from said guides.

13. A loom, comprising means for supplying fabric-edge threads, means for associating courses of warp thread therewith and producing terminal loops in said courses to embrace said fabric-edge threads, spaced rotating guides one of which is provided with a series of teeth and to which guides such partially-formed fabric is fed with the teeth of said toothed guide engaging the same at said fabric-edge threads, means for withdrawing said partially-formed fabric from said guides in a path oblique to that of the feed of said partially fed fabric to said guides, and means for associating courses of weft thread with said courses of warp thread; in combination with a movable carrier, and a plurality of separate automatically retracted means movably mounted upon said carrier, and means normally maintaining each of said last named means in position to be successively engaged with said partially-formed fabric at said tooth guide and to temporarily hold such partially-formed fabric during a phase of its movement in withdrawal from said guides, and means for intermittently moving said carrier.

14. A loom, comprising means for supplying fabric-edge threads, means for associating courses of warp thread therewith, a pair of spaced rotating guides to which the thus partially-formed fabric is fed, one of said guides being provided with a series of teeth, and means for withdrawing said partially-formed fabric from said guides in a path oblique to the feed of the partially-formed fabric to said guides; in combination with a movable carrier, means for intermittently moving the carrier, and shed-forming means mounted upon said carrier and adapted to successively dislodge and temporarily retain portions of said partially-formed fabric and to cause the same to relatively diverge, and means for operating said shed-forming means.

15. A loom, comprising means for supplying fabric-edge threads, means for associating courses of warp thread therewith and producing terminal loops in said courses to embrace said fabric-edge threads, spaced rotating guides one of which is provided with a series of teeth and to which guides such partially-formed fabric is fed with the teeth of said guide engaging the same at said fabric-edge threads, means for withdrawing said partially-formed fabric from said guides in a path oblique to that of the feed of said partially-formed fabric to said guides, and means for associating courses of weft thread with said courses of warp thread; in combination with a movable carrier, and a plurality of separate automatically retracted means movably mounted upon said carrier, and means normally maintaining each of said last named means in position to be successively engaged with said partially-formed fabric at said tooth guide and to temporarily hold such partially-formed fabric during a phase of its movement in withdrawal from said guides; means being provided for jointly rotating said guides.

16. A loom, comprising means for supplying fabric-edge threads, means for associating courses of warp thread therewith, a pair of spaced rotating guides to which the thus partially-formed fabric is fed, one of said guides being provided with a series of teeth, and means for withdrawing said partially-formed fabric from said guides in a path oblique to the feed of the partially-formed fabric to said guides; in combination with a movable carrier, means for intermittently moving the carrier, and shed-forming means mounted upon said carrier and adapted to successively dislodge and temporarily retain portions of said partially-formed fabric and to cause the same to relatively diverge, and means for operating said shed-forming means; means being provided for jointly rotating said guides.

17. A loom, comprising means for supplying fabric-edge threads, means for associating courses of warp thread therewith and producing terminal loops in said courses to embrace said fabric-edge threads, spaced rotating guides one of which is provided with a series of teeth and to which guides such partially-formed fabric is fed with the teeth of said guides engaging the same at said fabric-edge threads, means for withdrawing said partially-formed fabric from said guides in a path oblique to that of the feed of said partially-formed fabric to said guides, and means for associating courses of weft thread with said courses of warp thread; in combination with a movable carrier, and a plurality of separate automatically retracted means movably mounted upon said carrier, and means normally maintaining each of said last named means in position to be successively engaged with said partially-formed fabric at said tooth guide and to temporarily hold such partially-formed fabric during a phase of its movement in withdrawal from said guides; means being provided for jointly rotating said guides under actuation of said carrier.

18. A loom, comprising means for supplying fabric-edge threads, means for associating courses of warp thread therewith and producing terminal loops in said courses to embrace said fabric-edge threads, spaced rotating guides one of which is provided with a series of teeth and to which guides such partially-formed fabric is fed with the teeth of said guides engaging the same at said fabric-edge threads, means for withdrawing said partially-formed fabric from said guides in a path oblique to that of the feed of said partially-fed fabric to said guides, and means for associating courses of weft thread with said courses of warp thread; in combination with a movable carrier, and a plurality of separate automatically retracted means movably mounted upon said carrier, and means normally maintaining each of said last named means in position to be successively engaged with said partially-formed fabric at said tooth guide and to temporarily hold such partially-formed fabric during a phase of its movement in withdrawal from said guides; means being provided for jointly rotating said guides under actuation of said carrier, and means for throwing said rotating means out of operation.

19. A loom, comprising means for supplying fabric-edge threads, means for associating courses of warp thread therewith, a pair of spaced rotating guides to which the thus partially-formed fabric is fed, one of said guides being provided with a series of teeth, and means for withdrawing said partially-formed fabric from said guides in a path oblique to the feed of the partially-formed fabric to said guides; in combination with a movable carrier, means for intermittently moving the carrier, and shed-forming means mounted upon said carrier and adapted to successively dislodge and temporarily retain portions of said partially-formed fabric and to cause the same to relatively diverge, and means for operating said shed-forming means; means being provided for jointly rotating said guides under actuation of said carrier.

20. A loom, comprising guide means, means for supplying fabric-edge threads and leading the same to said guide means, means for associating courses of warp thread with said fabric-edge threads, means for withdrawing the so partially-formed fabric from said guide means in a path oblique to that of the plane in which such partially-formed fabric is conducted to said guide means, and means for associating courses of weft thread with said courses of warp thread; said means for associating courses of warp thread with said fabric-edge threads comprising a rotating element provided with a warp thread guide, warp thread issuing from which is looped about said fabric-edge threads.

21. A loom, comprising guide means, means for supplying fabric-edge threads and leading the same to said guide means, means for associating courses of warp thread with said fabric-edge threads, means for withdrawing the so partially-formed fabric from said guide means in a path oblique to that of the plane in which such partially-formed fabric is conducted to said guide means, and means for associating courses of weft thread with said courses of warp thread; said means for associating courses of warp thread with said fabric-edge threads comprising a rotating element provided with a warp thread guide, warp thread issuing from which is looped about said fabric-edge threads; and means for operating said rotating element.

22. A loom, comprising guide means, means for supplying fabric-edge threads and leading the same to said guide means, means for associating courses of warp thread with said fabric-edge threads, means for withdrawing the so partially-formed fabric from said guide means in a path oblique to that of the plane in which such partially-formed fabric is conducted to said guide means, and means for associating courses of weft thread with said courses of warp thread; said means for associating courses of warp thread with said fabric-edge threads comprising a rotating element provided with a warp thread guide, warp thread issuing from which is looped about said fabric-edge threads; and said means for supplying fabric-edge threads comprising an element having thread guides to which thread is fed concentrically with the center of rotation of said rotating element.

23. A loom, comprising means for supplying fabric-edge threads, means for associating courses of warp thread therewith, rotating guide means to which the so partially-formed fabric is fed, means for withdrawing such partially-formed fabric from said guide means in a path oblique to the plane of feed of such partially-formed fabric to said guide means, and means for associating courses of weft thread with such partially-formed fabric; in combination with a rotating drum provided with longitudinal ways, means whereby said rotating guide means is rotated in the rotation of said drum, a plurality of elements mounted to travel respectively in connection with said ways and each automatically retracted, means normally stationing each of said last named means in position to be engaged with the edge of said partially-formed fabric and to receive the same and temporarily hold the same during the rotation of said drum, and means to successively disengage said elements from said partially-completed fabric.

24. A loom comprising means for supplying fabric-edge threads, means for associating courses of warp thread therewith, guide means to which the thus partially-formed fabric is fed, means for withdrawing such partially-formed fabric from said guide means in a path oblique with respect to the plane of feed of such partially-formed fabric to said guide means, and means for associating courses of weft thread with such partially-formed fabric; in combination with a movable carrier, a plurality of means automatically retracted and movably mounted upon said carrier, means normally maintaining said last named means in position to be successively engaged with portions of such partially-formed fabric and to temporarily hold the same during movement of said carrier, and means for disengaging such partially-formed fabric from said means for temporarily holding the same.

25. A loom, comprising means for supplying fabric-edge threads, means for associating therewith courses of warp thread, guide means to which the thus partially-formed fabric is fed, means for withdrawing such partially-formed fabric from said guide means in a path oblique to the path of feed of such partially-formed fabric to said guide means, and means for associating courses of weft thread with such partially-formed fabric; in combination with a movable carrier, shed-forming means mounted upon said carrier and comprising members adapted to be successively engaged with said partially-formed fabric to dislodge the same from said guide means, means for operating said members to cause adjacent portions of the partially-formed fabric to diverge, and means for dislodging such partially-formed fabric from said members.

26. In a loom, shed-forming means, comprising a plurality of alternately oppositely moved fingers provided with thread-receiving notches and tapered terminal portions, and means for alternately oppositely moving the same.

27. In a loom, shed-forming means, comprising a plurality of alternately oppositely moved fingers provided with thread-receiving notches and tapered terminal portions, and means for alternately oppositely moving the same; said last named means comprising a cam member provided with alternately oppositely inclined cam surfaces with which said fingers co-act.

28. In a loom, shed-forming means, comprising a plurality of alternately oppositely moved fingers provided with thread-receiving notches and tapered terminal portions, and means for alternately oppositely moving the same; said last named means comprising a cam member provided with alternately oppositely inclined cam surfaces with which said fingers co-act; said cam member being provided with an extended neutral surface over which said fingers ride in passing from one of said inclined cam surfaces to another.

29. In a loom, shed-forming means, comprising a plurality of alternately oppositely moved fingers provided with thread-receiving notches and tapered terminal portions, and means for alternately oppositely moving the same; said last named means comprising a cam member provided with alternately oppositely inclined cam surfaces with which said fingers co-act; said fingers being arranged in a circular series, and said cam surfaces being arranged in a series of corresponding formation, means for moving said series of fingers in a circular path, means for reciprocating said cam member in a path transverse to the plane of the path of the movement of said fingers.

30. In a loom, shed-forming means, comprising a plurality of alternately oppositely moved fingers provided with thread-receiving notches and tapered terminal portions, and means for alternately oppositely moving the same; said last named means comprising a cam member provided with alternately oppositely inclined cam surfaces with which said fingers co-act; said fingers being arranged in a circular series, and said cam surfaces being arranged in a series of corresponding formation, means for moving said series of fingers in a circular path, and means for reciprocating said cam member in a path transverse to the plane of the path of the movement of said fingers, means exerting a tendency to hold each of said fingers in engagement with said cam member being likewise provided.

31. In a loom, a shed-forming finger, comprising a body provided with a terminal portion having a thread-receiving lateral notch and upper respectively curved and straight edges forming a point adapted to enter between and separate warp thread courses to cause warp thread of one course to enter said notch.

32. In a loom, shed-forming means for separating adjacent warp courses, means for introducing a weft course between said separated warp courses, and rotating comb means for closely associating such weft course with the last previously completed fabric.

33. In a loom, shed-forming means for separating adjacent warp courses, means for introducing a weft course between said separated warp courses, and rotating comb means for closely associating such weft course with the last previously completed fabric; said comb means comprising a carrier provided with a plurality of teeth disposed in alternation with the warp thread courses.

34. In a loom, shed-forming means for separating adjacent warp courses, means for introducing a weft course between said separated warp courses, and rotating comb means for closely associating such weft course with the last previously completed fabric; said comb means comprising a carrier provided with a plurality of teeth disposed in alternation with the warp thread courses, and means for advancing and retracting said teeth toward and away from the completed fabric.

35. In a loom, means for supplying fabric-edge threads, means for associating courses of warp thread with said fabric-edge threads, guide means to which the thus partially-completed fabric is fed, a rotating drum, and means for withdrawing such partially-completed fabric from said guide means adjacent to said drum; said drum comprising end spiders the peripheries of which are plurally notched, means bridging said notches in one of said spiders, and wire strands engaged with said means in loops in the respective notches and looped in engagement with the periphery of the other spider through the notches therein to provide ways, and means mounted upon said ways and adapted to be engaged with and to temporarily hold the partially-completed fabric during a phase of its withdrawal from said guide means.

36. In a loom, means for supplying fabric-edge threads, means for associating courses of warp threads with said fabric-edge threads, guide means to which the thus partially-completed fabric is fed, a rotating drum, and means for withdrawing such partially-completed fabric from said guide means adjacent to said drum; said drum comprising end spiders the peripheries of which are plurally notched, means bridging said notches in one of said spiders, and wire strands engaged with said means in loops in the respective notches and looped in engagement with the periphery of the other spider through the notches therein to provide ways, and means mounted upon said ways and adapted to be engaged with and to temporarily hold the partially-completed fabric during a phase of its withdrawal from said guide means; said last named means comprising catch hooks having bodies provided with bifurcated extensions slidably embracing said wire strands.

37. In a loom, means for supplying fabric-edge threads, means for associating courses of warp thread with said fabric-edge threads, guide means to which the thus partially-completed fabric is fed, a rotating drum, and means for withdrawing such partially-completed fabric from said guide means adjacent to said drum; said drum comprising end spiders the peripheries of which are plurally notched, means bridging said notches in one of said spiders, and wire strands engaged with said means in loops in the respective notches and looped in engagement with the periphery of the other spider through the notches therein to provide ways, and means mounted upon said ways and adapted to be engaged with and to temporarily hold the partially-completed fabric during a phase of its withdrawal from said guide means; said last named means comprising catch hooks having bodies provided with bifurcated extensions slidably embracing said wire strands; one of said spiders being provided with catch fingers, and separate contractile means being engaged respectively with each of said catch hook bodies and one of said catch fingers.

38. A loom, comprising means for supplying partially-formed fabric including warp thread courses, and means for associating weft thread courses with said warp thread courses; said last named means comprising a shuttle-needle provided with a tubular body and a lateral eye communicating at one side with said tubular body, and means for supplying weft thread to said tubular body; and a shield disposed adjacent to the path of play of said shuttle-needle and over which the thread is fed to the shuttle-needle in its withdrawal stroke to an amount in excess of the amount of thread applied by the shuttle-needle in its insertion stroke.

39. A loom, comprising means for supplying partially-formed fabric including warp thread courses, and means for associating weft thread courses with said warp thread courses; said last named means comprising a shuttle-needle provided with a tubular body and a lateral eye communicating at one side with said tubular body, and means for supplying weft thread to said tubular body; and means over which the thread is fed to the shuttle-needle in its withdrawal stroke to an amount in excess of the amount of thread applied by the shuttle-needle in its insertion stroke.

40. A loom, comprising means for supplying partially-formed fabric including warp thread courses, and means for associating weft thread courses with said warp thread courses; said last named means comprising a shuttle-needle provided with a tubular body and a lateral eye communicating at one side with said tubular body, and means for supplying weft thread to said tubular body; and means for supplying to the shuttle-needle upon its withdrawal stroke a greater amount of weft thread than is introduced by the shuttle-needle on its insertion stroke.

41. A loom, comprising means for supplying partially-formed fabric including warp thread courses, and means for associating weft thread courses with said warp thread courses; said last named means comprising a shuttle-needle provided with a tubular body and a lateral eye communicating at one side with said tubular body, and means for supplying weft thread to said tubular body; in combination with means for temporarily engaging and holding the courses of weft thread introduced by the shuttle-needle, and means for projecting and withdrawing said last named means from service position.

42. A loom, comprising means for supplying partially-formed fabric including warp thread courses, and means for associating weft thread courses with said warp thread courses; said last named means comprising a shuttle-needle provided with a tubular body and a lateral eye communicating at one side with said tubular body, and means for supplying weft thread to said tubular body; retaining pins for engaging and temporarily holding the courses of weft thread introduced by the shuttle-needle, and means for projecting and retracting said retaining pins; said last named means comprising rocker arms upon which the retaining pins are mounted, and means for operating said rocker arms.

43. A loom, comprising means for supplying partially-formed fabric including warp thread courses, and means for associating weft thread courses with said warp thread courses; said last named means comprising a shuttle-needle provided with a tubular body and a lateral eye communicating at one side with said tubular body, and means for supplying weft thread to said tubular body; retaining pins for engaging and temporarily holding the courses of weft thread introduced by the shuttle-needle, and means for projecting and retracting said retaining pins; said last named means comprising rocker arms; each of said rocker arms being jointed whereby said retaining pins may be withdrawn in paths of least resistance.

44. A loom, comprising means for supplying partially-formed fabric including warp thread courses, and means for associating weft thread courses with said warp thread courses; said last named means comprising a shuttle-needle provided with a tubular body and a lateral eye communicating at one side with said tubular body, and means for supplying weft thread to said tubular body; retaining pins for engaging and temporarily holding the courses of weft thread introduced by the shuttle-needle, and means for projecting and retracting said retaining pins; said last named means comprising rocker arms; each of said rocker arms being jointed whereby said retaining pins may be withdrawn in paths of least resistance; said jointed rocker arms being provided with means yieldingly opposing movement as between the jointed parts thereof.

45. A loom, comprising means for supplying partially-formed fabric including warp thread courses, and means for associating weft thread courses with said warp thread courses; said last named means comprising a shuttle-needle provided with a tubular body and a lateral eye communicating at one side with said tubular body, and means for supplying weft thread to said tubular body; retaining pins for engaging and temporarily holding the courses of weft thread introduced by the shuttle-needle, and means for projecting and retracting said retaining pins; said last named means comprising rocker arms, each of said rocker arms being jointed whereby said retaining pins may be withdrawn in paths of least resistance; said rocker arms being provided with means for relatively adjusting the jointed parts of the same to determine the degree of projection of said retaining pins into positions for engagement with the weft thread courses.

46. In a loom, means for supplying fabric, a drum for receiving the fabric, means for driving the drum at a constant speed, a guide roller positively driven in synchronism with the drum and supplying the fabric to the drum, a table receiving the fabric at a varying speed, an idler arranged between the table and the positively driven guide roller and around which the fabric is looped, and a yieldably mounted swinging frame carrying the idler and coöperating therewith to take up slack in the fabric.

47. In a loom, means for supplying fabric, a drum for receiving the fabric, means for driving the drum at a constant speed, a guide roller positively driven in synchronism with the drum and supplying the fabric to the drum, a shaft carrying the guide roller, a table receiving the fabric at a varying speed, an idler arranged between the table and the positively driven roller and around which the fabric is looped, and a yieldably mounted frame carrying the idler and pivotally mounted upon the shaft, said idler serving to take up any slack in the fabric.

48. In a loom, means for supplying partially-completed fabric, a movable carrier, means associated with the carrier for properly disposing the partially-completed fabric for the introduction of weft thread, a movable table over which the completed fabric is passed, and means for temporarily uniting the table and the carrier for joint movement.

49. In a loom, means for supplying partially-completed fabric, a movable carrier, means associated with the carrier for properly disposing the partially-completed fabric for the introduction of weft thread, a movable table over which the completed fabric is passed, and means for temporarily uniting the table and the carrier for joint movement; comb means being provided for closely associating with the completed fabric the successive accretions of weft thread, said comb means operating to so temporarily unite said table and carrier for joint movement.

50. In a loom, means for supplying partially completed fabric, a movable carrier, means associated with the carrier for properly disposing the partially-completed fabric for the introduction of weft thread, a movable table over which the completed fabric is passed, and means for temporarily uniting the table and the carrier for joint movement; comb means being provided for closely associating with the completed fabric the successive accretions of weft thread, said comb means operating to so temporarily unite said table and carrier for joint movement and being loosely coupled with said carrier and adapted to be coupled with said table in comb action movement.

51. In a loom, means for supplying partially-completed fabric, a movable carrier, means associated with the carrier for properly disposing the partially-completed fabric for the introduction of weft thread, a movable table over which the completed fabric is passed, and means for temporarily uniting the table and the carrier for joint movement; comb means being provided for closely associating with the completed fabric the successive accretions of weft thread, said comb means operating to so temporarily unite said table and carrier for joint movement; said carrier comprising a rotatable drum and said table being adapted to execute both reciprocating and oscillating movements, whereby said drum and table are adapted jointly to execute successive movements in the step rotation of said drum.

52. In a loom, means for supplying partially-completed fabric, a movable carrier, means associated with the carrier for properly disposing the partially-completed fabric for the introduction of weft thread, a movable table over which the completed fabric is passed, and means for temporarily uniting the table and the carrier for joint movement; comb means being provided for closely associating with the completed fabric the successive accretions of weft thread, said comb means operating to so temporarily unite said table and carrier for joint movement; said carrier comprising a rotatable drum and said table being adapted to execute both reciprocating and oscillating movements, whereby said drum and table are adapted jointly to execute successive movements in the step rotation of said drum; said drum being provided with said first-named means for engaging with the partially-formed fabric to temporarily hold the same, and with means for forming a shed in the partially-formed fabric for the reception of the weft thread.

53. In a loom, means for supplying partially-formed fabric, a movable carrier, means associated with the carrier for properly disposing the partially-completed fabric for the introduction of weft thread, a movable table over which the completed fabric is passed, and means for temporarily uniting the table and the carrier for joint movement; comb means being provided for closely associating with the completed fabric the successive accretions of weft thread, said comb means operating to so temporarily unite said table and carrier for joint movement; said carrier comprising a rotatable drum and said table being adapted to execute both reciprocating and oscillating movements, whereby said drum and table are adapted jointly to execute successive movements in the step rotation of said drum; said drum being provided with said first-named means for engaging with the partially-formed fabric to temporarily hold the same, and with means for forming a shed in the partially-formed fabric for the reception of the weft thread, and trip means being provided for disengaging each of said last named means from the partially-completed fabric.

54. In a loom, means for supplying partially-completed fabric, a movable carrier, means associated with the carrier for properly disposing the partially-completed fabric for the introduction of weft thread, a movable table over which the completed fabric is passed, and means for temporarily uniting the table and the carrier for joint movement; means further being provided for disengaging the partially-completed fabric from said means for properly disposing the partially-completed fabric for the introduction of weft thread.

55. In a loom, means for supplying partially-completed fabric, a rotatable drum, means for moving the partially completed fabric adjacent to said drum, means mounted upon the drum for temporarily holding the partially-completed fabric during the introduction of weft thread, a table mounted for movement in one direction with and in another direction away from said drum, means for uniting said drum and said table for movement in a step of rotation of said drum, and means for disengaging from said partially-completed fabric said means for temporarily holding the same.

56. In a loom, means for supplying partially-completed fabric, a rotatable drum, means for moving the partially-completed fabric adjacent to said drum, means mounted upon the drum for temporarily holding the partially-completed fabric during the introduction of weft thread, a table mounted for movement in one direction with and in another direction away from said drum, means for uniting said drum and said table for movement in a step of rotation of said drum, and means for disengaging from said partially completed fabric said means for temporarily holding the same; means likewise being mounted upon said drum for relatively separating adjacent portions of said partially-completed fabric for the reception of weft thread.

57. In a loom, means for supplying partially-completed fabric, a rotatable drum, means for moving the partially-completed fabric adjacent to said drum, means mounted upon the drum for temporarily holding the partially-completed fabric during the introduction of weft thread, a table mounted for movement in one direction with and in another direction away from said drum, means for uniting said drum and said table for movement in a step of rotation of said drum, and means for disengaging from said partially-completed fabric said means for temporarily holding the same; means likewise being mounted upon said drum for relatively separating adjacent portions of said partially-completed fabric for the reception of weft thread, and means being provided for disengaging the partially-completed fabric from said last named means.

58. In a loom, means for supplying partially-completed fabric, a rotatable drum, means for moving the partially-completed fabric adjacent to said drum, means mounted upon the drum for temporarily holding the partially-completed fabric during the introduction of weft thread, a table mounted for movement in one direction with and in another direction away from said drum, means for uniting said drum and said table for movement in a step of rotation of said drum, and means for disengaging from said partially-completed fabric said means for temporarily holding the same; in combination with means for associating weft thread with said partially completed fabric, and comb means for closely associating with the completed fabric successive accretions of weft thread.

59. In a loom, means for supplying partially-completed fabric, a rotatable drum, means for moving the partially-completed fabric adjacent to said drum, means mounted upon the drum for temporarily holding the partially-completed fabric during the introduction of weft thread, a table mounted for movement in one direction with and in another direction away from said drum, means for uniting said drum and said table for movement in a step of rotation of said drum, and means for disengaging from said partially-completed fabric said means for temporarily holding the same; in combination with means for associating weft thread with said partially-completed fabric, and comb means for closely associating with the completed fabric successive accretions of weft thread; said comb means being operatively connected with said drum and being adapted in its movement to be operatively engaged with said table to unite said table and drum in couple for joint movement.

60. In a loom, means for supplying partially-completed fabric, a rotatable drum, means for moving the partially-completed fabric adjacent to said drum, means mounted upon the drum for temporarily holding the partially-completed fabric during the introduction of weft thread, a table mounted for movement in one direction with and in another direction away from said drum, means for uniting said drum and said table for movement in a step of rotation of said drum, and means for disengaging from said partially-completed fabric said means for temporarily holding the same; in combination with means for associating weft thread with said partially-completed fabric, and comb means for closely associating with the completed fabric successive accretions of weft thread; said comb means being operatively connected with said drum and being adapted in its movement to be operatively engaged with said table to unite said table and drum in couple for joint movement; and said comb means operating through said means for associating weft thread with said partially-completed fabric to set said table into motion and resultantly cause through said comb means motion of said drum jointly with said table.

61. In a loom, means for supply partially-completed fabric, a rotatable drum, means for moving the partially-completed fabric adjacent to said drum, means mounted upon the drum for temporarily holding the partially-completed fabric during the introduction of weft thread, a table mounted for movement in one direction with and in another direction away from said drum, means for uniting said drum and said table for movement in a step of rotation of said drum, and means for disengaging from said partially-completed fabric said means for temporarily holding the same; in combination with means for associating weft thread with said partially-completed fabric, and comb means for closely associating with the completed fabric successive accretions of weft thread; said comb means being operatively connected with said drum and being adapted in its movement to be operatively engaged with said table to unite said table and drum in couple for joint movement.

62. In a loom, means for supplying partially completed fabric, a movable carrier, means associated with the carrier for properly disposing the partially completed fabric for the introduction of weft thread, a movable table over which the completed fabric is passed, and means for temporarily uniting the table and the carrier for joint movement; in combination with means for supplying weft thread to the partially completed fabric, and temporary retaining means for engagement with the courses of applied weft thread.

63. In a loom, means for supplying partially completed fabric, a movable carrier, means associated with the carrier for properly disposing the partially-completed fabric for the introduction of weft thread, a movable table over which the completed fabric is passed, and means for temporarily uniting the table and the carrier for joint movement; in combination with means for supplying weft thread to the partially completed fabric, and temporary retaining means for engagement with the courses of applied weft thread; and means for operating said temporary retaining means into and out of position of service.

64. In a loom, means for supplying partially-completed fabric, a movable carrier, means associated with the carrier for properly disposing the partially-completed fabric for the introduction of weft thread, a movable table over which the completed fabric is passed, and means for temporarily uniting the table and the carrier for joint movement; in combination with means for supplying weft thread to the partially-completed fabric, and temporary retaining means for engagement with the courses of applied weft thread; and means for operating said temporary retaining means into and out of position of service; said temporary retaining means being disposed adjacent to the edge of said table.

65. In a loom, means for supplying partially-completed fabric, a movable carrier, means associated with the carrier for properly disposing the partially-completed fabric for the introduction of weft thread, a movable table over which the completed fabric is passed, and means for temporarily uniting the table and the carrier for joint movement; in combination with means for associating weft thread with the partially completed fabric, comb means for closely associating the successive accretions of weft thread with the completed fabric, such comb means serving to temporarily unite the table and carrier for said joint movement, and the table being provided with means co-acting with the fingers of the comb means to that end.

66. In a loom, means for supplying partially-completed fabric, a movable carrier, means associated with the carrier for properly disposing the partially-completed fabric for the introduction of weft thread, a movable table over which the completed fabric is passed, and means for temporarily uniting the table and the carrier for joint movement; in combination with means for supplying weft thread to the partially-completed fabric, and comb means for closely associating the successive accretions of weft thread with the completed fabric; said comb means serving to temporarily unite the carrier and the table for said joint movement, and said comb means serving to initiate operation of said table.

67. In a loom, means for supplying partially-completed fabric, a movable carrier, means associated with the carrier for properly disposing the partially-completed fabric for the introduction of weft thread, a movable table over which the completed fabric is passed, and means for temporarily uniting the table and the carrier for joint movement; in combination with means for supplying weft thread to the partially-completed fabric, and comb means for closely associating the successive accretions of weft thread with the completed fabric; said comb means serving to temporarily unite the carrier and the table for said joint movement, and said comb means serving to initiate operation of said table through said means for supplying weft thread to the partially-completed fabric.

68. In a loom, means for supplying partially-completed fabric, a movable carrier, means associated with the carrier for properly disposing the partially-completed fabric for the introduction of weft thread, a movable table over which the completed fabric is passed, and means for temporarily uniting the table and the carrier for joint movement; in combination with means for supplying weft thread to the partially-completed fabric, and comb means for closely associating the successive accretions of weft thread with the completed fabric; said comb means serving to temporarily unite the carrier and the table for said joint movement, and said comb means serving to initiate operation of said table through said means for supplying weft thread to the partially-completed fabric.

69. In a loom, means for supplying partially-completed fabric, a movable carrier, means associated with the carrier for properly disposing the partially-completed fabric for the introduction of weft thread, a movable table over which the completed fabric is passed, and means for temporarily uniting the table and the carrier for joint movement and for setting the table into motion to cause resultant movement of the carrier.

70. In a loom, means for supplying partially-completed fabric, a movable carrier, means associated with the carrier for properly disposing the partially-completed fabric for the introduction of weft thread, a movable table over which the completed fabric is passed, and means for temporarily uniting the table and the carrier for joint movement and to cause movement of the table to resultantly jointly move the carrier and table.

71. In a loom, take-off means for disposing of the woven fabric, comprising a movable table, a clamping member associated therewith, means for moving the table and clamping member in one direction with fabric held thereby, means for relatively moving the table and clamping member to free the fabric, and means for moving the table and clamping member in another direction relative to the fabric.

72. In a loom, take-off means for disposing of the woven fabric, comprising a movable table, a clamping member associated therewith, means for moving the table and clamping member in one direction with fabric held thereby, means for relatively moving the table and clamping member to free the fabric, and means for moving the table and clamping member in another direction relative to the fabric, said clamping member having a yieldingly mounted portion which is directly engaged with the fabric.

73. In a loom, take-off means for disposing of the woven fabric, comprising a movable table, a clamping member associated therewith, means for moving the table and clamping member in one direction with fabric held thereby, means for relatively moving the table and clamping member to free the fabric, means for moving the table and clamping member in another direction relative to the fabric, and operating means for said clamping member comprising a power shaft, a cam thereon, a rocker arm, and operative connections between said rocker arm and said clamping member.

74. In a loom, take-off means for disposing of the woven fabric, comprising a movable table, a clamping member associated therewith, means for moving the table and clamping member in one direction with fabric held thereby, means for relatively moving the table and clamping member to free the fabric, and means for moving the table and clamping member in another direction relative to the fabric; said table being mounted for both reciprocatory and oscillatory movements, and means for imparting such movements to said table.

75. In a loom, take-off means for disposing of the woven fabric, comprising a movable table, a clamping member associated therewith, means for moving the table and clamping member in one direction with fabric held thereby, means for relatively moving the table and clamping member to free the fabric, and means for moving the table and clamping member in another direction relative to the fabric; said table being mounted for both reciprocatory and oscillatory movements, and means for imparting such movements to said table; temporary locking means being provided for preventing return movement of said table, and means for operating said temporary locking means.

76. In a loom, take-off means for disposing of the woven fabric, comprising a movable table, a clamping member associated therewith, means for moving the table and clamping member in one direction with fabric held thereby, means for relatively moving the table and clamping member to free the fabric, and means for moving the table and clamping member in another direction relative to the fabric; said table being mounted for both reciprocatory and oscillatory movements, and means for imparting such movements to said table; tensional means being provided for exerting a tendency to restore said table to its normal position.

77. In a loom, take-off means for disposing of the woven fabric, comprising a movable table, a clamping member associated therewith, means for moving the table and clamping member in one direction with fabric held thereby, means for relatively moving the table and clamping member to free the fabric, and means for moving the table and clamping member in another direction relative to the fabric; said table being mounted for both reciprocatory and oscillatory movements, and means for imparting such movements to said table; a cam and roller coöperating therewith being associated with said table and with a separate support respectively whereby reciprocatory movement of said table produces oscillatory movement thereof.

78. In a loom, means for supplying partially-completed fabric, a movable carrier, means associated with the carrier for properly disposing the partially-completed fabric for the introduction of weft thread, a movable table over which the completed fabric is passed and means for temporarily uniting the table and the carrier for joint movement; said carrier and said table having correspondingly curved peripheral portions.

79. In a loom, take-off means for the fabric, comprising a movable table, a fixed table to which the fabric is fed by the movable table, the movable table having a curved surface and the fixed table having a plane surface, and a guide member in engagement with which the fabric passes from the movable table to the fixed table to bring the fabric into superficial contact with the plane surface of the fixed table.

80. In a loom, take-off means for the fabric, comprising a movable table, a fixed table to which the fabric is fed by the movable table, the movable table having a curved surface and the fixed table having a plane surface, and a guide member in engagement with which the fabric passes from the movable table to the fixed table to bring the fabric into superficial contact with the plane surface of the fixed table; in combination with a drum, and means for directing to the drum at a constant speed fabric taken from said tables at a variable speed.

81. In a loom, take-off means for the fabric, comprising a movable table, a fixed table to which the fabric is fed by the movable table, the movable table having a curved surface and the fixed table having a plane surface, and a guide member in engagement with which the fabric passes from the movable table to the fixed table to bring the fabric into superficial contact with the plane surface of the fixed table; in combination with a drum, and means for directing to the drum at a constant speed fabric taken from said tables at a variable speed; means being provided for operating said drum to accurately wind fabric thereon irrespective of increase of diameter of the developing roll of fabric upon the drum.

82. In a loom, means for supplying fabric, a drum for receiving the fabric, a guide roller geared to the drum and from which the fabric is supplied to the drum, a friction cone rigid with the guide roller, a constantly driven friction wheel engaging the friction cone, means for adjusting the position of the friction wheel on the cone, a table receiving the fabric at a varying speed, and means interposed between the table and the guide roller for automatically taking up slack.

83. In a loom, means for supplying fabric, a fabric receiving drum, a table formed with a fixed section and an intermittently movable section, the fabric being supplied to the fixed table section at a varying speed from the intermittently movable table section, and means for supplying to the drum at a constant speed the fabric thus received at a varying speed.

84. A loom, comprising means for supplying selvage threads, means for associating courses of warp thread with the selvage threads, such warp thread being independent of the selvage threads, and means for associating courses of weft thread with the courses of warp thread.

85. A loom, comprising means for supplying selvage threads, means for associating courses of warp thread with the selvage threads, and means for associating courses of weft thread with the courses of warp thread; both said warp thread and said weft thread being independent of said selvage threads.

86. A loom, comprising means for supplying selvage threads, means for associating courses of warp thread with the selvage threads, and means for associating courses of weft thread with the courses of warp thread; both said warp thread and said weft thread being independent of said selvage threads, and said courses of warp thread and said courses of weft thread being related to the selvage threads at angles of less than 90 degrees.

87. In a loom, means for supplying partially-formed fabric, means for associating weft thread with the partially-formed fabric, a movable carrier, means upon the carrier for temporarily retaining the partially-formed fabric during the association therewith of weft thread, means upon the carrier for producing shed formations in the partially-formed fabric for the reception of the weft thread, comb means for associating with the completed fabric accretions of weft thread associated with the partially-formed fabric, temporary locking means for preventing movement of the carrier, and means for operating the comb means, said latter means controlling the operation of said temporary locking means to release the carrier for movement during movement of the comb means.

88. In a loom, means for supplying partially-formed fabric, means for associating weft thread with the partially-formed fabric, a movable carrier, means upon the carrier for temporarily retaining the partially-formed fabric during the association therewith of weft thread, means upon the carrier for producing shed formations in the partially-formed fabric for the reception of the weft thread, comb means for associating with the completed fabric accretions of weft thread associated with the partially-formed fabric, temporary locking means for preventing movement of the carrier, and means for operating the comb means, said latter means controlling the operation of said temporary locking means to release the carrier for movement during movement of the comb means; said carrier and said comb means being adapted likewise for joint operation.

89. In a loom, means for supplying partially-completed fabric, a movable carrier, means associated with the carrier for properly disposing the partially-completed fabric for the introduction of weft thread, a movable table over which the completed fabric is passed, and means for temporarily uniting the table and the carrier for joint movement.

90. In a loom, means for supplying partially-completed fabric, a movable carrier, means associated with the carrier for properly disposing the partially-completed fabric for the introduction of weft thread, a movable table over which the completed fabric is passed, and means for temporarily uniting the table and the carrier for joint movement; means likewise being provided for producing such joint movement.

91. A loom, comprising means for supplying selvage threads, means for associating continuous warp threads with such selvage threads whereby the selvage threads are disposed longitudinally at the side edges of the resultant fabric, and means for associating weft threads with the warp threads whereby the weft threads and the warp threads are disposed each in courses having an angularity with the selvage threads of less than 90 degrees.

92. A loom, comprising means for supplying selvage threads, means for associating continuous warp threads with such selvage threads whereby the selvage threads are disposed longitudinally at the side edges of the resultant fabric, and means for associating weft threads with the warp threads whereby the weft threads and the warp threads are disposed each in courses having an angularity with the selvage threads of less than 90 degrees, and whereby the weft thread courses and the warp thread courses are related respectively at an angularity of approximately 90 degrees.

93. A loom, comprising means for supplying selvage threads, means for associating continuous warp threads with such selvage threads whereby the selvage threads are disposed longitudinally at the side edges of the resultant fabric, and means for associating weft threads with the warp threads whereby the weft threads and the warp threads are disposed each in courses having an angularity with the selvage threads of less than 90 degrees, and whereby the courses of warp thread embrace in terminal loops the selvage threads.

94. A loom, comprising means for supplying selvage threads, and means for associating courses of continuous warp thread and courses of weft thread with the selvage threads during the feed of the latter to produce a bias fabric with the selvage threads extending longitudinally at the side edges thereof.

95. A loom, comprising means for supplying selvage threads, and means for associating courses of continuous warp thread and courses of weft thread with the selvage threads to produce a bias fabric with the selvage threads extending longitudinally at the side edges thereof and with the courses of warp thread embracing in terminal loops the selvage threads.

96. A loom, comprising a means for supplying selvage threads, and means for associating courses of warp threads and courses of weft threads with the selvage threads to produce a bias fabric with the selvage threads extending longitudinally at the side edges thereof and with one class of courses only in engagement with the selvage threads.

97. A loom, comprising means for supplying selvage threads, and means for associating courses of warp threads and courses of weft threads with the selvage threads to produce a bias fabric with the selvage threads extending longitudinally at the side edges thereof and with one class of courses only embracing in loops the selvage threads.

In testimony whereof, I have signed my name to this specification in the presence of two subscribing witnesses.

HOWARD I. MORRIS.

Witnesses:
CLAUS SPRECKELS,
H. U. MABERYS.